US010042426B2

(12) United States Patent
Kamamori

(10) Patent No.: US 10,042,426 B2
(45) Date of Patent: Aug. 7, 2018

(54) INFORMATION PROCESSING APPARATUS FOR DETECTING OBJECT FROM IMAGE, METHOD FOR CONTROLLING THE APPARATUS, AND STORAGE MEDIUM

(71) Applicant: CANON KABUSHIKI KAISHA, Tokyo (JP)

(72) Inventor: Yuki Kamamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 14/792,420

(22) Filed: Jul. 6, 2015

(65) Prior Publication Data

US 2016/0011670 A1 Jan. 14, 2016

(30) Foreign Application Priority Data

Jul. 9, 2014 (JP) .................................. 2014-141805

(51) Int. Cl.
*G06F 3/01* (2006.01)
*G06F 3/041* (2006.01)
*G06K 9/00* (2006.01)

(52) U.S. Cl.
CPC .............. *G06F 3/017* (2013.01); *G06F 3/041* (2013.01); *G06K 9/00355* (2013.01); *G06K 9/00375* (2013.01); *G06F 2203/04101* (2013.01)

(58) Field of Classification Search
CPC ..................................................... G06F 3/017
See application file for complete search history.

(56) References Cited

U.S. PATENT DOCUMENTS

| 8,589,824 | B2 * | 11/2013 | Hillis | G06F 3/017 |
| | | | | 382/103 |
| 8,624,962 | B2 * | 1/2014 | Lopes | G06T 19/00 |
| | | | | 348/50 |
| 8,817,125 | B2 * | 8/2014 | Song | G06K 9/2027 |
| | | | | 348/222.1 |
| 9,262,015 | B2 * | 2/2016 | Avrahami | G06F 1/1626 |
| 9,498,718 | B2 * | 11/2016 | Latta | G06F 3/011 |
| 2006/0192782 | A1 * | 8/2006 | Hildreth | A63F 13/00 |
| | | | | 345/473 |
| 2008/0013826 | A1 * | 1/2008 | Hillis | G06F 3/017 |
| | | | | 382/154 |
| 2008/0244468 | A1 * | 10/2008 | Nishihara | G06F 3/017 |
| | | | | 715/863 |

(Continued)

FOREIGN PATENT DOCUMENTS

| EP | 1879130 A2 | 1/2008 |
| FR | 2970797 A1 | 7/2012 |
| JP | 2007-64894 A | 3/2007 |

*Primary Examiner* — Dorothy Harris
(74) *Attorney, Agent, or Firm* — Canon USA, Inc. I.P. Division

(57) ABSTRACT

An information processing apparatus includes an acquisition unit configured to acquire an input image, and an extraction unit configured to extract, in an area corresponding to a part including the predetermined surface in the background in the space, an object area corresponding to an object existing at the side closer to a foreground than the surface, using a first reference, from the input image, and to extract, in an area corresponding to a part not including the surface in the background in the space, an object area corresponding to the object using a second reference different from the first reference, from the input image.

16 Claims, 15 Drawing Sheets

(56) References Cited

U.S. PATENT DOCUMENTS

| | | | |
|---|---|---|---|
| 2008/0278462 A1* | 11/2008 | Chang | G06F 1/1626 |
| | | | 345/179 |
| 2009/0103780 A1* | 4/2009 | Nishihara | G06F 3/017 |
| | | | 382/103 |
| 2009/0115721 A1* | 5/2009 | Aull | G06F 3/017 |
| | | | 345/156 |
| 2009/0217211 A1* | 8/2009 | Hildreth | G06F 3/017 |
| | | | 715/863 |
| 2009/0244309 A1* | 10/2009 | Maison | G06K 9/00369 |
| | | | 348/222.1 |
| 2010/0271333 A1* | 10/2010 | Lai | G06F 3/0428 |
| | | | 345/175 |
| 2010/0295779 A1* | 11/2010 | Pearce | G06F 3/03545 |
| | | | 345/157 |
| 2010/0315413 A1* | 12/2010 | Izadi | G06F 3/017 |
| | | | 345/419 |
| 2011/0316767 A1 | 12/2011 | Avrahami | |
| 2013/0135199 A1* | 5/2013 | Perski | G06F 3/017 |
| | | | 345/156 |
| 2015/0234471 A1* | 8/2015 | Niinuma | G06F 3/017 |
| | | | 345/156 |
| 2016/0231866 A1* | 8/2016 | Tretter | G06F 3/14 |

\* cited by examiner

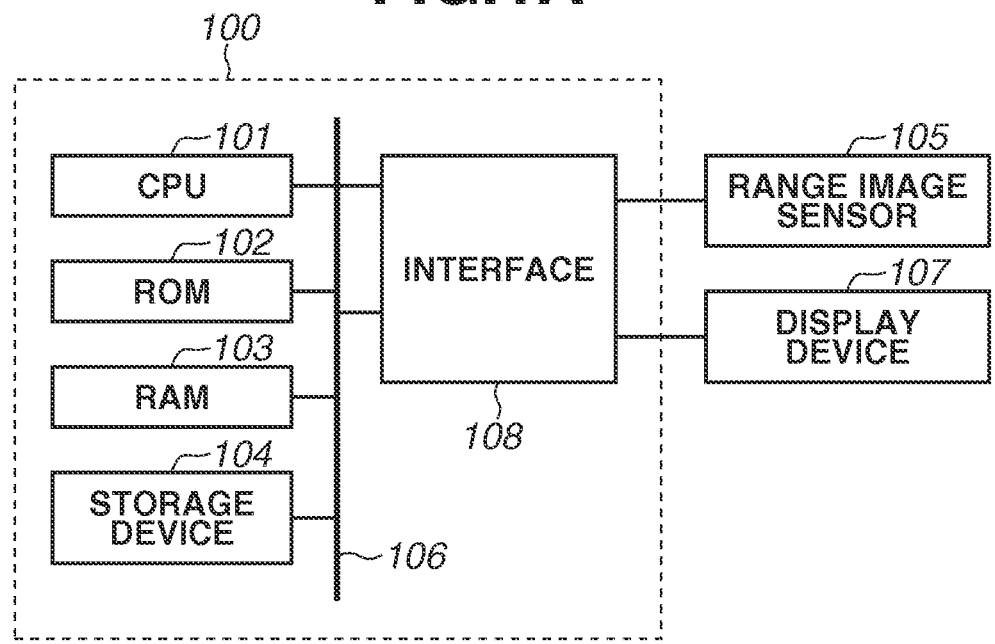
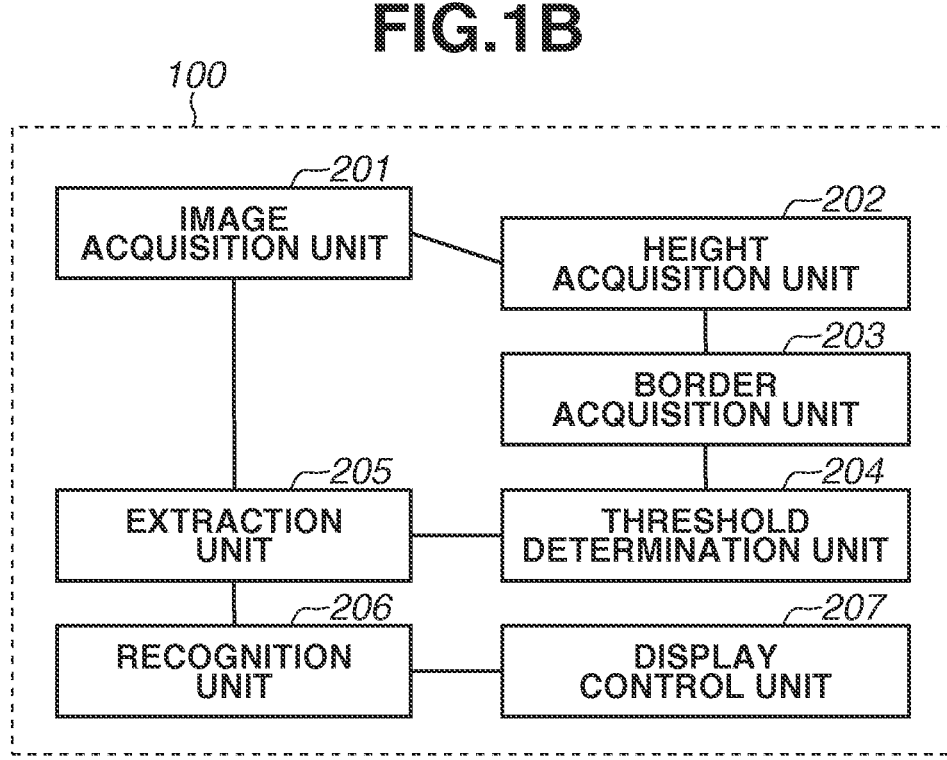

FIG.2
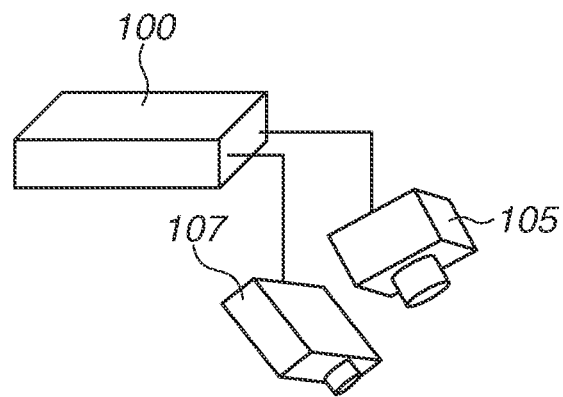
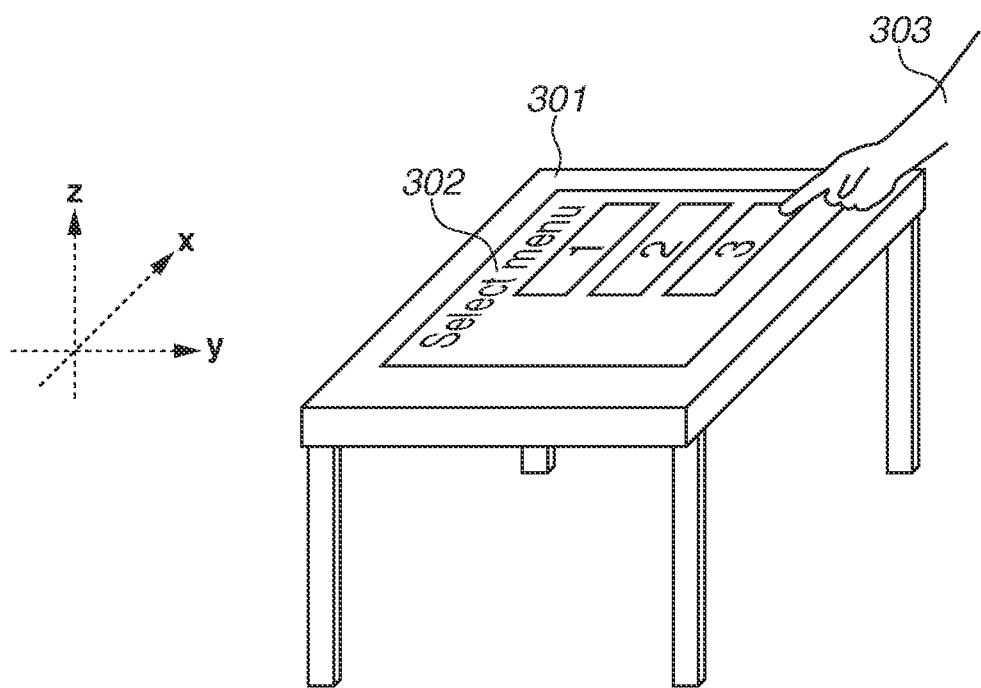

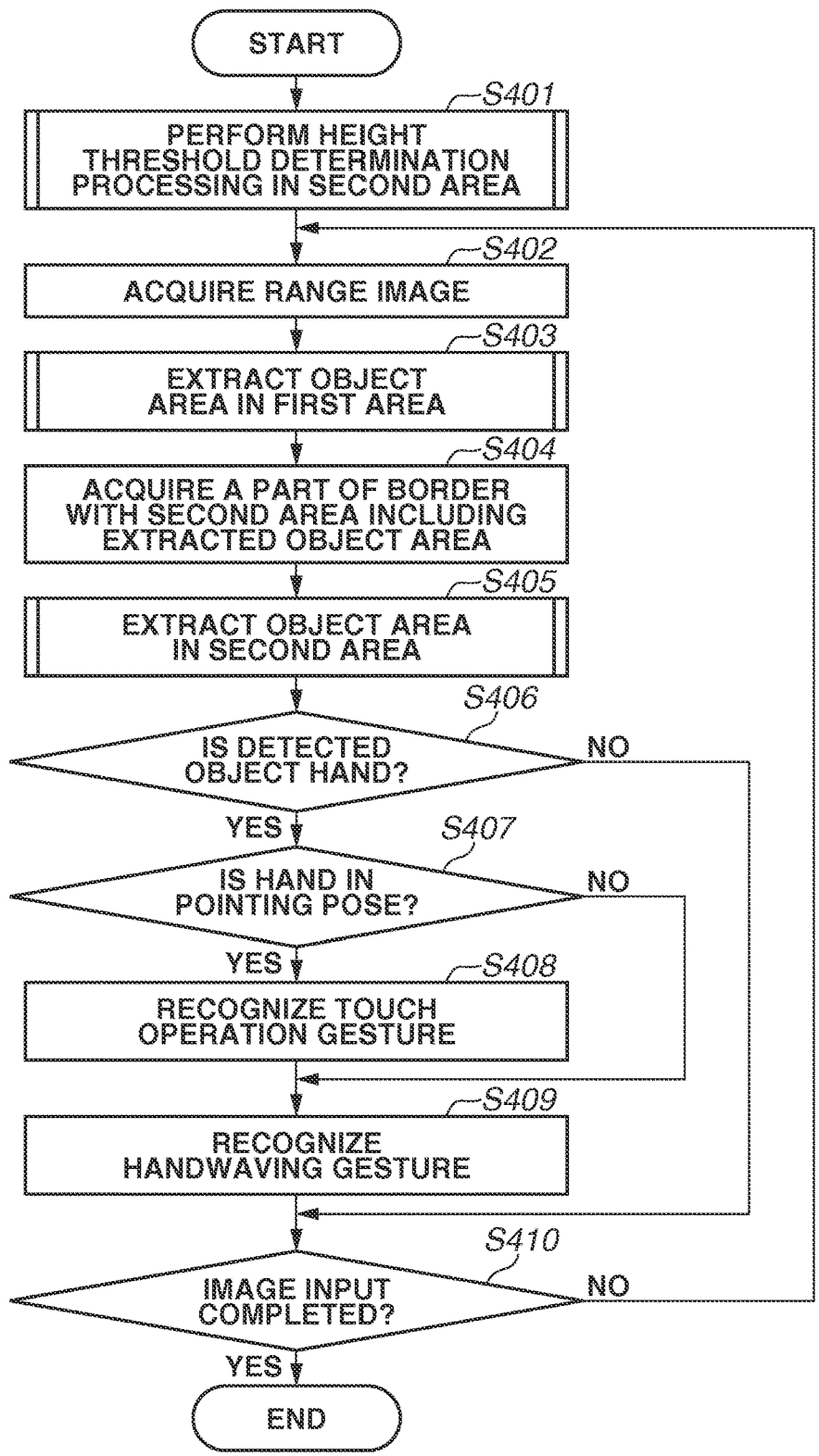

- Prior Art -

- Prior Art -

- Prior Art -

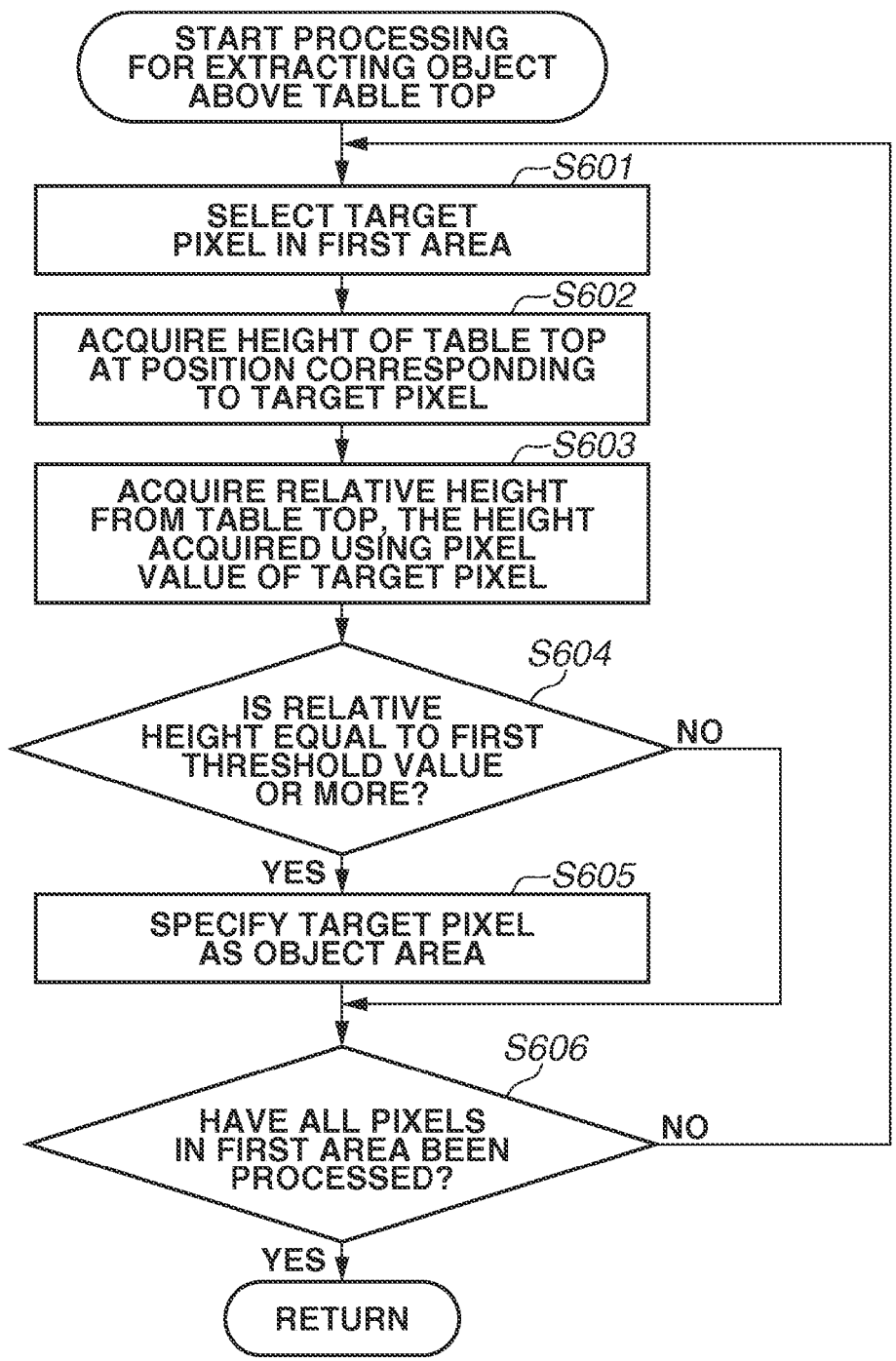

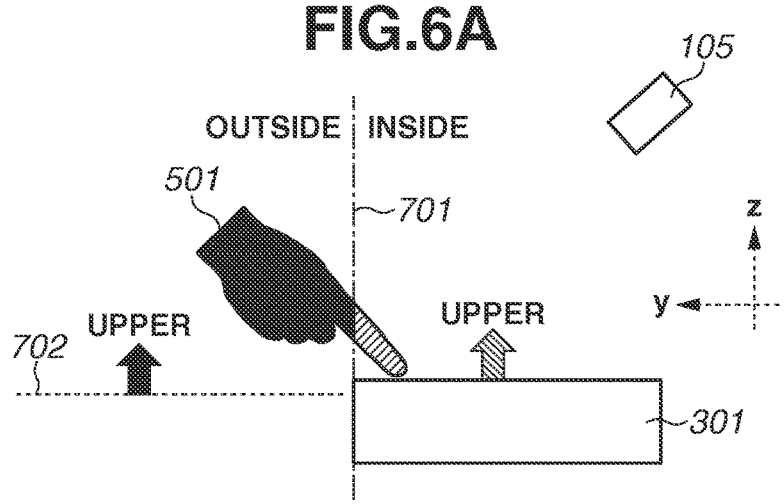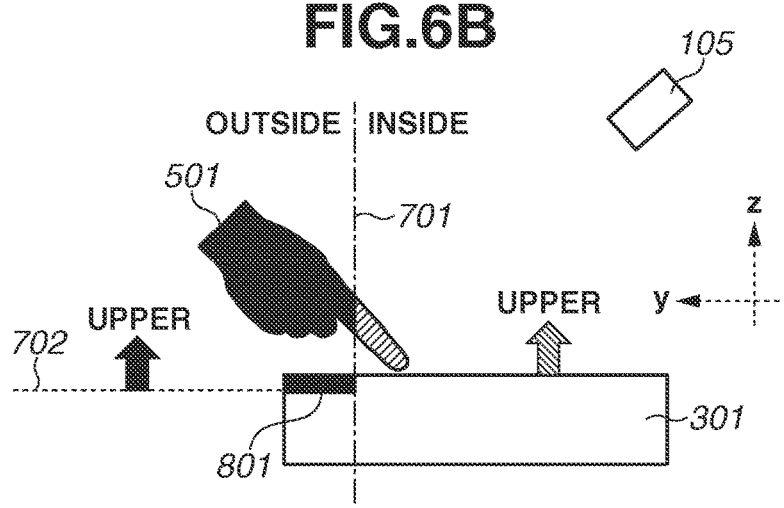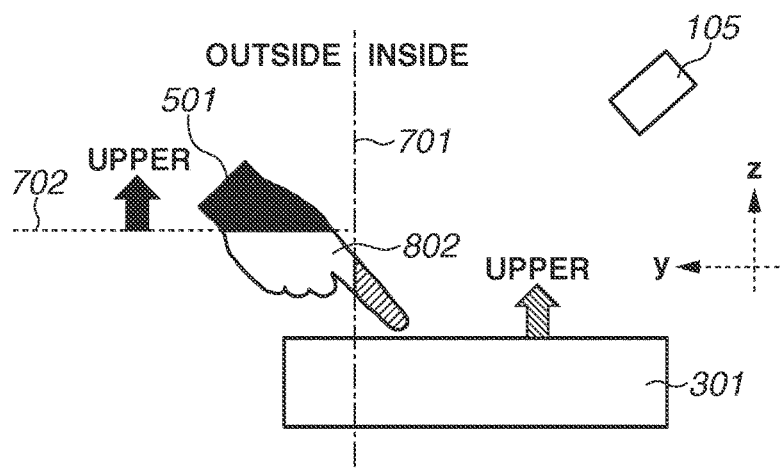

INFORMATION PROCESSING APPARATUS FOR DETECTING OBJECT FROM IMAGE, METHOD FOR CONTROLLING THE APPARATUS, AND STORAGE MEDIUM

BACKGROUND OF THE INVENTION

Field of the Invention

The present invention relates to a technique for identifying an object in a background and a moving object relating to a gesture operation or the like based on distance information.

Description of the Related Art

A system for performing an operation on an object displayed or placed on a board such as a white board and a table using a user interface (UI) that allows input by a gesture has been proposed. In such a system, it is preferable that, in a two-dimensional space parallel to the board, a difference between an operation area where the system can recognize an operation by a gesture, a touch, or the like, and the size and shape of the board is small. In other words, it is expected that an operation can be performed in almost all of the board area.

In the above-mentioned system, in many cases, in a state where a flat part of a predetermined board faces from the front, an image including the board within an angle of view is captured, and from the captured image, an object moving above the board is detected to recognize an operation performed by the object. In an area where a fixed board is included in a background, using known background subtraction, the area including the object above the board can be easily extracted. In an area (if the board is a table, the periphery of the table) not including the board in the background, however, as compared to the area above the board, positions and the number of objects existing in the background are unstable. Consequently, it is not always appropriate to use the background subtraction similarly to the detection of objects above the board.

Japanese Patent Application Laid-Open No. 2007-64894 discusses, in processing for detecting an object from an image, to use different object detection methods for respective partial areas depending on predetermined factors.

In a system in which an operation area and a predetermined board have different size and shape, the object detection is to be performed both in an area (above the board) including the board in a background, and in an area not including the board in the background. In the known technique, the detection of an object existing over two areas of different background conditions is not fully considered.

SUMMARY OF THE INVENTION

The present invention is directed to performing accurate object recognition in a space including a plurality of areas of different background conditions.

According to an aspect of the present invention, an information processing apparatus includes an image acquisition unit configured to acquire an input image and, for each pixel of the input image, positional information in a space including a predetermined surface as part of a background, and an extraction unit configured to extract from the acquired input image, in an area corresponding to a part of the space including the surface in the background, an object area corresponding to an object existing in the foreground with respect to the surface, based on positional information of the object in the acquired input image, positional information of the surface, and a first reference, and to extract from the acquired input image, in an area corresponding to a part of the space not including the surface in the background, an object area corresponding to the object existing in the foreground with respect to the surface, based on the positional information of the object in the acquired input image, and a second reference different from the first reference.

Further features of the present invention will become apparent from the following description of exemplary embodiments with reference to the attached drawings.

BRIEF DESCRIPTION OF THE DRAWINGS

FIG. 1A and FIG. 1B are block diagrams illustrating examples of a hardware configuration and a functional configuration of an information processing apparatus, respectively.

FIG. 2 illustrates an example of an appearance of a system according to a first exemplary embodiment.

FIG. 3 is a flowchart illustrating an example of gesture recognition processing according to the first exemplary embodiment.

FIG. 5 is a flowchart illustrating an example of processing for extracting an object area in an area including a table.

FIG. 6A, FIG. 6B, and FIG. 6C are conceptual views illustrating detection of an object existing at a position higher than a table top.

DESCRIPTION OF THE EMBODIMENTS

Figure 4A:
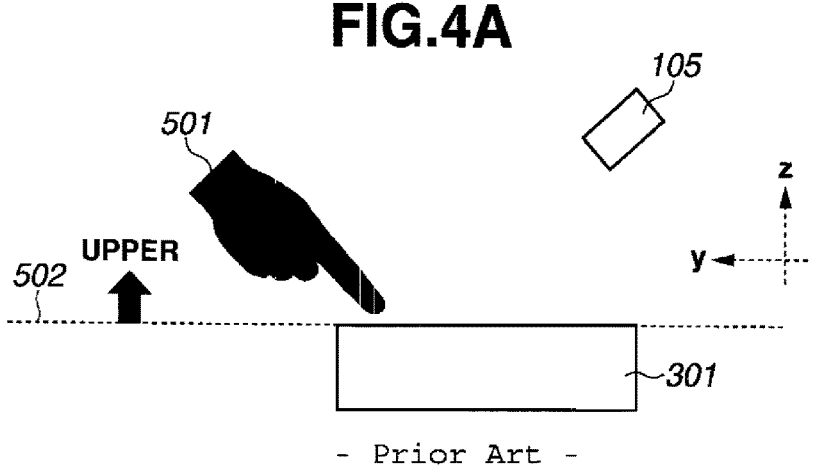
FIG. 4A, FIG. 4B, and FIG. 4C are conceptual views illustrating detection of an object existing at a position higher than a table top according to a known technique.

Hereinafter, information processing according to the exemplary embodiments of the present invention will be described in detail with reference to the attached drawings. The configurations described in the exemplary embodiments are only examples, and the scope of the present invention is not limited to the configurations.

As a first exemplary embodiment of the present invention, an example of a table top interface (I/F) system for a user to perform a gesture operation onto a graphical user interface (GUI) projected on a table top is described. In the exemplary embodiments below, a predetermined board included in a background in a space where a gesture is to be performed is expressed as a "table (table top)", however, in place of the table (in this case, the table refers to a table as an object), a vertically provided screen or white board can be used. In this description, the table (table top), the screen, the white board, and the like are referred to as a "board", however, the board is not limited to a plate-like object having no uneven portion on its surface. The board in this description refers to a physical surface having a finite area, and the surface can be assumed to be in a stable motionless state.

An example of the object (hereinafter, referred to as an operation object) to be used by a user to make a gesture includes a hand of the user. Further, other parts (for example, fingers and legs), or an object to be held by the user (for example, a stylus) can be used as the operation object.

FIG. 1A is a block diagram illustrating a hardware configuration of an information processing apparatus 100 according to the first exemplary embodiment.

A central processing unit (CPU) 101, with a random access memory (RAM) 103 as a work memory, runs an operating system (OS) and programs stored in a read-only memory (ROM) 102 and a storage device 104, controls components connected to a system bus 106, and performs calculation and logical determination in various kinds of processing. The processing to be performed by the CPU 101 includes gesture recognition processing (information processing in a system for recognizing a gesture performed by a user as an operation input) illustrated in flowcharts described below. The OS and the processing programs can be stored in the storage device 104, and in such a case, information necessary at the time of power supply is read into the RAM 103 as necessary. The storage device 104 is, for example, an external storage device connected via a various types of I/Fs such as a hard disk drive, a network, and a universal serial bus (USB). In this exemplary embodiment, the storage device 104 stores, for example, digital data to be projected on a table top, coordinate transformation parameters acquired by calibration, and a background image captured in advance.

A range image sensor 105, according to the control by the CPU 101, captures an image of a space including a table top on which a GUI is projected and displayed as a part of a background, and further including a space including a peripheral area (hereinafter, referred to as table peripheral space) of the table by a method described below, to acquire a range image. The range image sensor 105 inputs the acquired range image into the information processing apparatus 100 via the system bus 106. Each pixel of the captured and acquired range image reflects a distance from a sensor to an object. The range image sensor 105 is installed such that, in a case where an operation object exists in the table peripheral space, the operation object is to be captured in a foreground (area closer than the table) of the table that is a part of the background. In this exemplary embodiment, as a method for acquiring the range image, a Time-of-Flight method that has a small impact on environment light and display on the table top is described, however, depending on the intended use, a parallax method, a Time-of-Flight method, and other methods can be used. A display device 107 includes a display, a projector, or the like for displaying an image such as a GUI and various kinds of information. In this exemplary embodiment, a liquid crystal projector is used as the display device 107.

In this exemplary embodiment, the range image sensor 105 and the display device 107 are external devices connected to the information processing apparatus 100 via an interface 108 for input and output, respectively. These components can be integrated into the information processing apparatus 100.

FIG. 1B is a block diagram illustrating an example of a functional configuration of the information processing apparatus 100. These functional units are implemented by the CPU 101 by loading the programs stored in the ROM 102 into the RAM 103, and executing processing according to the flowcharts described below. If hardware is to be configured in place of software processing using the CPU 101, calculation units and circuits corresponding to the processing performed in the below-described functional units are configured.

An image acquisition unit 201 acquires a range image input from the range image sensor 105 as an input image. The input image is an image of a table peripheral space captured by the range image sensor 105, and each pixel value reflects distance information from the range image sensor 105 to the object. In this exemplary embodiment, the range image sensor 105 is installed to capture an image of the space including the table as a part of a background. The distance information included in the pixel value of the range image corresponds to positional information in the direction intersecting with an upper surface of the table.

A height acquisition unit 202 acquires, based on a position of the pixel of the input image and its pixel value, three-dimensional positional information of the object in the table peripheral space. The three-dimensional positional information that can be acquired by the height acquisition unit 202 includes, at least, height information of the object existing above the table top and in information of the table (foreground of the table top).

A border acquisition unit 203 acquires, based on the three-dimensional positional information acquired from the input image, a position of a border between an area including the table top in the background, and an area including no table top in the background in the table peripheral space. In the description below, the area including the table top in the background (a range corresponding to a space above the table) is referred to as a first area, and the area including no table top in the background (a range corresponding to a space of the table periphery) is referred to as a second area.

A threshold determination unit 204 determines, in the second area, a threshold value of a height to be used to extract from an input image an area including an object existing at a position higher than the table. In this exemplary embodiment, a second height threshold value to be used in the extraction processing for the second area is expressed as a height in a world coordinate system, and is subject to comparison processing with a height obtained by converting the size of the pixel value of the input image. The threshold determination unit 204 corrects the second height threshold value in a case where an object area extracted from the first area is in contact with a border between two areas.

An extraction unit 205 extracts, from each of the first area and the second area, an object area including an object existing at a position higher than the table based on respective height references of different heights. In this exemplary embodiment, in the first area, an object area is extracted by threshold value processing with the first height threshold value, using a relative height from the table top as a reference height. In the second area, an object area is extracted by threshold value processing with the second height threshold value, using a height (height in the world coordinate system) obtained by converting the size of pixel value of the input image.

A recognition unit 206 determines whether a whole object area where the object area extracted from the first area and the object area extracted from the second area are combined is a predetermined operation object such as a hand of a user, and recognizes a gesture operation performed by the operation object. In this exemplary embodiment, since a touch of the operation object onto the table top is recognized based on the three-dimensional positional information of the operation object without using a touch sensor, the touch operation is considered as a kind of gesture operations.

A display control unit 207 generates a display image to be displayed on the table top by the display device 107, and outputs the display image via the interface 108. In this exemplary embodiment, specifically, the display control unit 207 generates a display image showing a response to an operation recognized by the recognition unit 206 based on the data stored in the storage device 104 or other devices, and outputs the image to clearly specify feedback on the operation for the user.

[System Appearance]

FIG. 2 illustrates an example of an appearance of a system to which the information processing apparatus 100 according to the exemplary embodiment can be applied. Above a table top 301, a liquid crystal projector which is the display device 107 is provided. For example, a GUI screen 302 is projected on the table top 301. The user uses an operation object such as a hand 303 to perform a touch operation for touching a GUI object included in the GUI screen 302. In the system illustrated in FIG. 2, an operation area that is a range where the system can recognize an operation such as a gesture and a touch corresponds to a range above the table top 301 on which projection by the display device 107 can be performed. In a positional relationship between the display device 107 and the table top 301, the display device 107 and the table top 301 are fixed such that a central portion of the table top 301 corresponds to a central portion of the display screen projected by the display device 107, and image projection can be performed onto a range of 90% or more of a surface of the table top 301. As long as the projection onto the surface of the table top 301 can be performed, it is not always necessary to install a housing of the display device 107 above the table 301.

The range image sensor 105 is also provided above the table top 301, and acquires a captured range image of a table peripheral space including the table top 301 as a part of a background. The information processing apparatus 100 detects the hand 303 from the acquired range image, and recognizes a gesture of the user performed in the table top 301 peripheral space. In this exemplary embodiment, as illustrated in FIG. 2, coordinate axes of x, y, and z are defined. In FIG. 2, a two-dimensional plane parallel to a table upper surface is an x, y plane, and a direction orthogonal to the table upper surface and extending upward is a normal direction of the z axis. In each pixel of the range image captured by the range image sensor 105, a pixel value corresponding to a distance from the sensor to the object is recorded. In this exemplary embodiment, as illustrated in FIG. 2, the range image sensor 105 is fixed to include the table top 301 in its angle of view, and the object in a range image to be captured exists between the range image sensor 105 and the table top 301. Accordingly, the distance from the sensor to the object can be relatively construed as information reflecting the distance (height) from the surface of the table top 301. In FIG. 2, however, since the range image sensor 105 is fixed to have an angle with respect to the table top 301, the surface of the table top 301 has a tilt with respect to an image capturing element of the range image sensor 105 even if the distance provides a plane having a constant height from the surface of the table top 301. Consequently, in this exemplary embodiment, coordinate transformation is performed to the distance information indicated by the individual pixel value in the range image captured by the range image sensor 105 based on lens characteristics of the range image sensor 105 and the relative positional relationship with the table top 301 to map the coordinates in an xyz space. By such transformation, with respect to each point in a space including the table top 301 as a part of the background, xyz coordinates can be acquired. In FIG. 2, the z axis, which is reference information of the height from the table top, is perpendicular to the table top, however, some degrees of tilt can be allowed as far as the z axis is in a direction intersecting with the table top. As long as the distance information in the z axis direction can be acquired, the position of the housing of the range image sensor 105 is not limited to the position above the table top 301. In this exemplary embodiment, the table top is installed to be parallel with the ground, and the positional information (z coordinate) in the direction perpendicular to the table top is referred to as "height". But, depending on a direction of the table, the term "height" does not always refer to a vertical direction.

In this exemplary embodiment, at the time a positional relationship between the range image sensor 105 and the table top 301 is set in advance, a range image in which only the table is captured is acquired as a basic background image in advance. The information processing apparatus 100 stores the information of the range image acquired as the basic background image in the storage device 104. The acquisition of the basic background image is performed regularly, for example, immediately after the startup of the information processing apparatus 100, or at regular time intervals.

In this exemplary embodiment, the table top 301 can be a table top with a built-in display having a function of displaying the GUI screen 302. In addition to the above, a system including a visible light camera for capturing a visible light image of an object placed on the table top 301 can be configured.

As illustrated in FIG. 2, in this exemplary embodiment, the user stretches out the hand 303 over the table in the space from the outside of the peripheral space of the table top 301 to perform an operation. Consequently, for example, when the user touches a GUI object displayed at a position close to the edge of the table on the GUI screen, a part of the hand 303 is more likely to exist outside the edge of the table top 301. In such a case, from the view of the range image sensor 105, the hand of the user exists over the edge of the table. In this exemplary embodiment, for the area including the table in the background and the area including no table in the background in the table peripheral space, different height references are used to extract an area including an object existing above the table. Then, the extracted areas are combined to detect a whole image of the object existing over the border of the two areas.

FIG. 3 is a flowchart illustrating an example of the gesture recognition processing to be performed by the information processing apparatus 100 in this exemplary embodiment. This processing is implemented by the CPU 101, which constitutes functional units in the information processing apparatus, by loading a program stored in the ROM 102 into the RAM 103 and executing the program. In this exemplary embodiment, in response to execution of an application for recognizing a gesture operation, the range image sensor 105 starts image capturing of a range image, and the range image is input in the information processing apparatus 100 every predetermined time period. In response to the input of the captured range image, the processing in FIG. 2 starts.

Figure 8A:
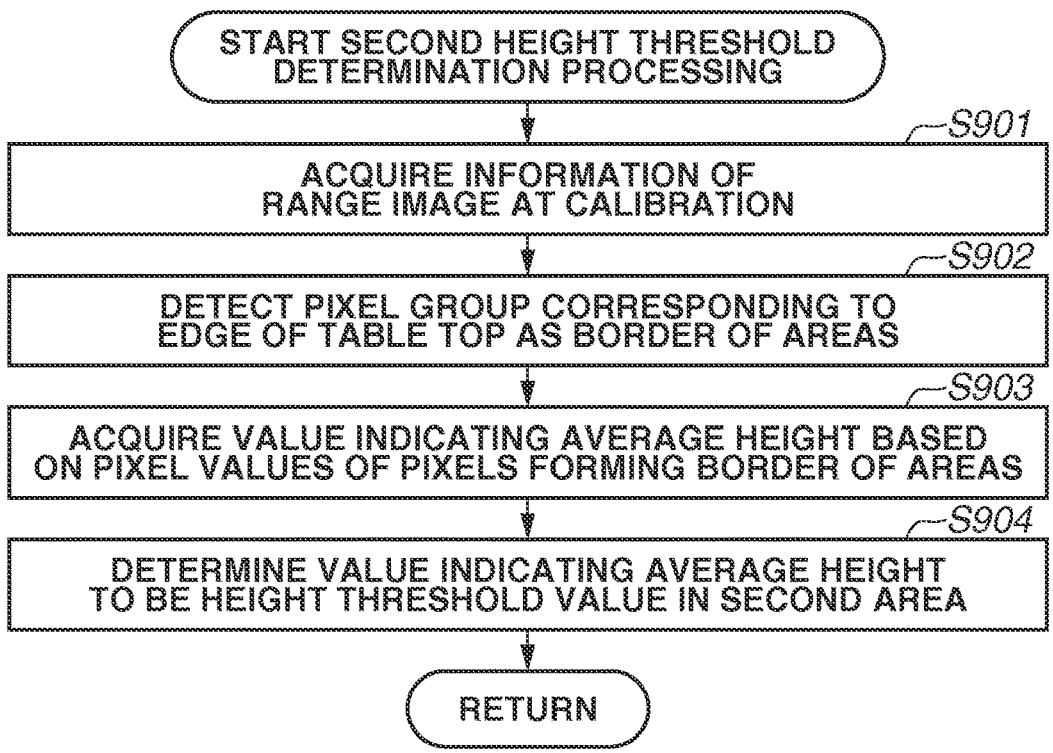
FIG. 8A and FIG. 8B are flowcharts illustrating examples of the processing for determining a second height threshold value to be used in the processing in the area including no table.

In step S401, the threshold determination unit 204 determines a threshold value to be used in the detection processing (step S408) of an object area in the area (the second area) including no table. With reference to the flowchart in FIG. 8A, the processing for determining a threshold value in the second area in step S401 is described in detail.

In step S901, the border acquisition unit 203 acquires pixel value information of a basic background image that has been captured in advance. In step S902, the border acquisition unit 203 detects pixels each having a difference larger than a predetermined value, the difference in the pixel value with an adjacent pixel. When the pixel value difference is large, it means that there is an extremely large height difference, and in such a case, it corresponds to an edge portion of the table. Consequently, a portion of continuous pixels, each of which has the difference in the pixel value from the adjacent pixel larger than the predetermined value, is used as a border between the area including the table in the background and the area including no table. The pixels used as the border are pixels (pixels having large pixel values) included in the range above the table. In step S903, the threshold determination unit 204 acquires a value indicating an average height based on the height information acquired by converting the pixel values of the pixels forming the border of the areas. In step S904, the threshold determination unit 204 determines the acquired average height to be a threshold value of the height in the second area. In this exemplary embodiment, the determined threshold value is stored in the RAM 103, and the stored value is referred to in performing the threshold value processing.

Returning to the flowchart in FIG. 3, in step S402, the image acquisition unit 201 acquires a range image input from the range image sensor 105 as an input image.

In step S403, the extraction unit 205 extracts, in the area (first area) including the table in the background, an area including an object existing at a position higher than the table as an object area from the input image. When an object exists at a position higher than the table, it means that the object exists in the foreground of the table as the background. In this exemplary embodiment, in the area including the table in the background, the object area is detected by performing processing using a relative height from the surface of the table as a reference height. Specifically, an area where a relative height from the surface of the table is higher than a predetermined threshold value (first height threshold value) is extracted as an object area. The height of the table and the height of the object are information detected by the same system, and so, using their relative values, detection with reduced coordinate transformation error and with reduced effects due to sensing error in the system can be performed. The processing in step S403 is described below in detail.

In step S404, the border acquisition unit 203 acquires coordinates of a part of the border between the first and the second areas including the object area extracted in step S403. In this exemplary embodiment, the user stretches out the hand above the table and performs an operation. Accordingly, when an object area is detected above the table, the object is more likely to exist over the edge of the table. Consequently, if the object area extracted from the first area is an area in which an operation object is captured, the part that belongs to the border detected in step S902 exists in the object area. In other words, the border part detected in step S902 includes at least a part of the object area extracted from the first area. On the other hand, if a part contacting the border of the first and the second areas is not included in the extracted object area, it is assumed that the object is not an operation object such as a hand of the user, but some object is placed on the table. In such a case, it is not necessary to follow the extracted object area and to recognize a gesture operation. Then, for example, the processing according to the flowchart ends, or the processing returns to the processing in step S402. The border acquisition unit 203 stores the acquired information on the part of the border in the RAM 103. In step S404, an area of a predetermined size, or a straight line (tangent line of the area border) of a predetermined length including the area that belongs to the border of the first and the second areas in the object area of the first area extracted in step S403 can be acquired.

In step S405, the extraction unit 205 extracts, in the area (second area) including no table, an area including an object existing at a position higher than the table as an object area from the input image. In this exemplary embodiment, in the area including no table in the background, the object area is detected by performing processing using a height indicated by the pixel values of the input image as a reference height. Specifically, the extraction is performed based on the threshold value processing using the height threshold value (second height threshold value) determined in step S401. The second height threshold value corresponds to a height of a virtual table surface when it is assumed that a table upper surface extends to the area including no table. That is, an area in which heights indicated by pixel values of the input image are higher than the virtual table surface indicated by the second height threshold value is extracted as an object area. In this exemplary embodiment, however, in consideration of detection errors in the positional information of the edge of the table and the table height information, the threshold value is corrected, and then, the threshold value processing is performed depending on a distance on an x-y plane from the border of the first and the second areas. The processing in step S405 is described below in detail.

In step S406, the recognition unit 206 determines whether the object captured in the area is a hand of the user with respect to a whole combined object area of the object areas extracted in step S403 and step S405. If the object used as the operation object is not the hand of the user but a predetermined object such as a stylus, the recognition unit 206 determines whether the combined object area is the operation object. In this exemplary embodiment, when the shape (the size, the degree of circularity, the aspect ratio, and the degree of unevenness) and the color information of the combined object area satisfy predetermined conditions, it is determined that the area is a hand of the user. The conditions include, for example, a high likelihood of matching result of the shape of the object area and a shape model provided in advance, and whether the object area is within a rectangle of a predetermined aspect ratio. Further, using a visible light image obtained by capturing the same range as the input image, whether an average of red-green-blue (RGB) values of the pixels in the object area is within a range set as "color of human skin" can be determined. If it is determined that the object is a hand of the user (YES in step S406), the processing proceeds to step S407. If it is determined that the object is not a hand of the user (NO in step S406), the processing proceeds to step S410.

In step S407, the recognition unit 206 determines whether the hand of the user is in a pointing pose based on the shape of the combined area. In this exemplary embodiment, matching with a model of a hand in a pointing pose, which is provided in advance, is performed, and the determination is performed based on the likelihood. If it is determined that the object is in a pointing pose (YES in step S407), the processing proceeds to step S408. If it is determined that the object is not in a pointing pose (NO in step S407), the processing proceeds to step S409.

In step S408, the recognition unit 206 recognizes a touch operation by the hand in the pointing pose. Specifically, the recognition unit 206 acquires the height information of a position corresponding to a fingertip in the object area, and determines whether the upper surface of the table is touched by the fingertip based on a difference between the height of the fingertip and the height of the table. When the upper surface is touched, processing corresponding to the object displayed at the touched position is executed. For example, the object displayed at the touched position is turned to a selected state, or a command associated with the object is executed. The display control unit 207 generates a display image indicating a response to the recognized operation, and outputs the image to the display device 107. If the upper surface of the table is not touched during a predetermined waiting time, the recognition of a touch operation stops and the processing proceeds to the next step.

In step S409, the recognition unit 206 stores the positional information of the object area in the RAM 103, and recognizes the gesture operation performed by the hand of the user based on the history in a predetermined time period. In this exemplary embodiment, the recognition unit 206 can recognize at least a gesture operation (swiping operation) of the hand of the user waving in a certain direction within the operation area. To recognize the swiping operation, in step S409, the recognition unit 206 specifies the positional information of the center of gravity in the object area. Then, the recognition unit 206 stores the information in the RAM 103 or another device, performs matching of the position of the center of gravity up to the time and a Hidden Markov Model (HMM) having the amount of the movement as a feature amount, and performs the recognition based on the likelihood. The display control unit 207 generates a display image indicating a response to the recognized swiping operation, and outputs the image to the display device 107.

The gesture recognition for a touch operation and a swiping operation in the processing from step S406 to step S409 in this exemplary embodiment is not limited to this flow. For example, regardless of the determination result of whether the object is a hand or not (step S406), and the determination result of whether the hand is in a pointing pose or not (step S407), the recognition of a touch operation (step S408) and the recognition of a swiping operation (step S409) can be performed. Further, using information indicating the height of the hand or the movement speed, the other gesture operations can be recognized.

If the processing in step S409 ends, or if it is determined and recognized, in step S406, that the object captured in the object area is not a hand of the user, then, in step S410, the CPU 101 determines whether the input of a range image from the range image sensor 105 has been completed. If the image input has been completed (YES in step S410), the gesture recognition processing ends. If the image input continues, the processing returns to step S402, and the gesture recognition processing is performed on a new input image.

[Processing for Extracting Object Area in First Area]

The processing to be performed in step S403 for extracting, in the first area including the table, an area including an object existing at a position higher than the table from the input image as an object area is described in detail.

Figure 4B:
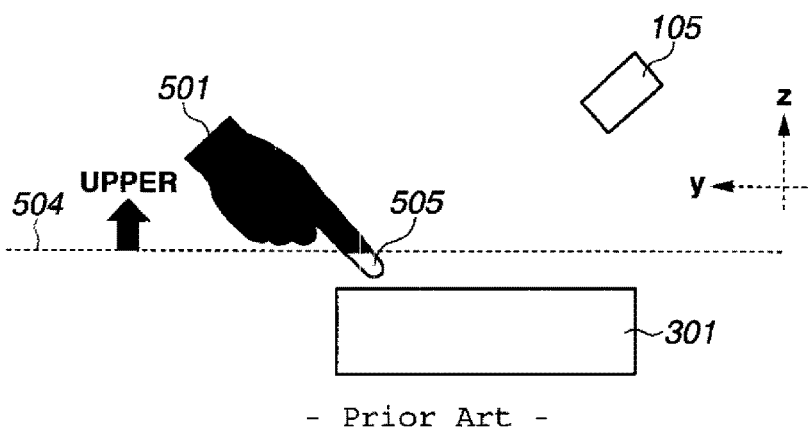
Figure 4C:
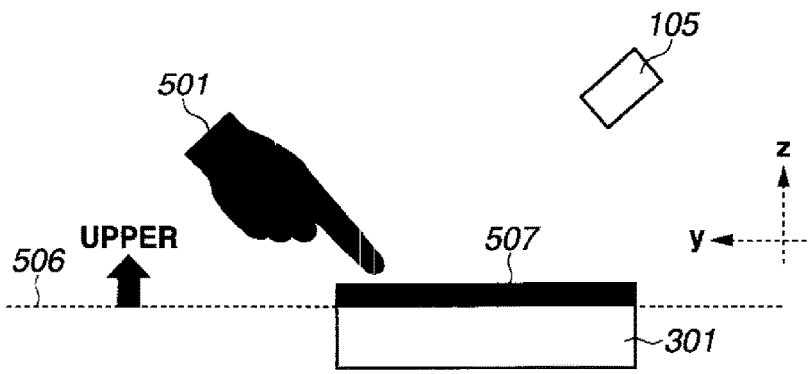

With reference to FIGS. 4A to 4C, processing for detecting a hand of a user stretched out over the edge of the table is described with issues likely to occur in the processing according to a known technique. FIGS. 4A to 4C illustrate the periphery of the table top 301 viewed from a cross section parallel to an yz plane in the system illustrated in FIG. 2. In FIGS. 4A to 4C, a hand 501 is a hand of a user pointing the table top 301 in a pointing pose (a state only the forefinger of one hand is stretched).

In the known technique, if the fact that the hand of the user is stretched out over the edge of the table is not considered, a portion having the height information of the height higher than the upper surface of the table top 301 can be detected from the input image as a hand area regardless of inside or outside of the edge of the table. FIG. 4A illustrates an ideal state. A height 502 is a height of the table top measured by the range image sensor 105. The whole of the hand 501 of the user exists at a position higher than the height 502, so that the hand can be accurately detected. In actual detection, however, due to errors in distance measurement depending on the performance of the range image sensor 105 and to errors in coordinate transformation parameters acquired by calibration, the results of conversion of the information acquired from a range image into coordinate information include errors. Consequently, it is difficult to accurately detect the height of the table top and to separate an upper part and a lower part with the table top as the border. For example, FIG. 4B illustrates a detected height of the table top higher than the true table top height. A height 504 is a height of the table top measured by the range image sensor 105. In this case, it is determined that a part of the hand 501 of the user is at the position lower than the height 504, and a loss 505 is produced in the detected area. FIG. 4C illustrates a detected height of the table top lower than the true table top height. A height 506 is a height of the table top measured by the range image sensor 105. In this case, a part 507 of the table exists at a position higher than the height 506 and the part is extracted as an object area, so that it is difficult to distinguish the object area from the true object area.

To solve the problems, in this exemplary embodiment, the pixels of the input image are separated in the first area including the table in the background and the second area including no table. In the first area, based on threshold value processing with a relative height with respect to a height of the table surface, an object area above the table is detected. Since errors in distance measurement or in coordinate transformation are included in both of the object area and the table top, the effects due to the errors can be reduced by acquiring a relative height.

With reference to the flowchart in FIG. 5, a specific flow of the processing to be performed in step S403 is described. In step S601, the height acquisition unit 202 selects a target pixel included in the first area from the input image. In this exemplary embodiment, as a position of an edge of the table can be acquired by using the basic background image captured in advance, a target pixel is selected by using the inside of the range, where the edge is regarded as the border, as the first area. In this exemplary embodiment, the target pixel is selected one by one. Alternatively, a block including a plurality of pixels can be selected one by one and the average value of the pixel values can be used as the height information of the block, so that the subsequent processing can be performed.

In step S602, the height acquisition unit 202 acquires a height of the table top at a position (position indicated by xy coordinates) corresponding to the target pixel. In this exemplary embodiment, the height acquisition unit 202 acquires information indicating the height of the table top at the position corresponding to the target pixel from the information of the range image captured in advance as a basic background image. The height of the table can be acquired using methods other than the method of using the range image captured in advance as a basic background image. For example, based on a difference from an input image of a previous frame, whether there is a movement in the table is determined. If there is no movement, it is determined that there is no object in the table, and a table height can be acquired again from the input image. This method is effective in a case where the latest table state differs from the state at the time of capturing the basic background image.

In step S603, the height acquisition unit 202 acquires a relative height from the table top corresponding to the height indicated by the pixel value of the target pixel. In this exemplary embodiment, the relative height is obtained by subtraction of the value of the target pixel and the acquired value of the table height. In step S604, the extraction unit 205 determines whether the acquired relative height is greater than or equal to a first height threshold value. The first height threshold value is set in advance as a value indicating a distance appropriate to distinguish the table and a hand of a user. If it is determined that the acquired relative height is greater than or equal to the first height threshold value (YES in step S604), the processing proceeds to step S605. If it is determined that the acquired relative height is not greater than or equal to the first height threshold value (NO in step S604), the processing proceeds to step S606. In step S605, the target pixel is specified as a part of the object area. In step S606, the height acquisition unit 202 determines whether all pixels in the first area have been processed. If it is determined that all pixels in the first area have been processed (YES in step S606), the processing returns to the main flow, and the processing in step S404 and steps thereafter is performed. If it is determined that all pixels in the first area have not been processed (NO in step S606), the processing returns to step S601. Then, a pixel that has not been processed is selected, and the processing is repeated. In the flowchart in FIG. 5, a target pixel is selected from the pixels in the first area that has been defined in advance, and the processing is performed on all pixels in the first area. Alternatively, processing for scanning all pixels in the input image, and determining whether the pixels are included in the first area can be additionally performed.

In this exemplary embodiment, the first height threshold value to be used in the extraction processing for the first area is a threshold value of a height to be compared with a relative height from the table top, and it is assumed that a predetermined value is to be referred to. The threshold determination unit 204 can perform correction processing on also the first height threshold value based on the input image to obtain a threshold value appropriate for the environment.

The processing to be performed in step S405 for extracting an area including an object existing at a position higher than the table as an object area in the second area where the table is not included in the range image is described in detail.

With reference to FIGS. 6A to 6C, examples of states likely to occur in detecting a hand of a user existing over the edge of the table separately in two areas, one of which includes the table and the other of which includes no table, are described. FIGS. 6A to 6C illustrate the periphery of the table top 301 viewed from a cross section parallel to the yz plane in the system illustrated in FIG. 2. Similarly to FIGS. 4A to 4C, the hand 501 is a hand of the user pointing the table top 301 in a pointing pose (a state only the forefinger of one hand is stretched).

As described above, in the first area above the table, noise and loss in detection of an object area can be reduced by using the processing with a threshold value of a relative height from the table. FIG. 6A illustrates a state where the boarder of the first area and the second area is accurately detected. A border 701 corresponds to the edge of the table detected in step S902 based on the basic background image, and the border of the first area and the second area. The height 702 is a threshold value (second height threshold) of a height in the second area, which has been set in step S401. In the detection of the border of the first area and the second area based on the basic background image, errors might be sometimes found. For example, due to an error in sensing, at a position corresponding to a pixel considered to be outside the edge of the table, the table might exist actually. FIG. 6B illustrates a case in which a detected height of the table top is lower than a true table height in a state where the edge of the table is detected to be at a position closer to the inside of the table than an actual position. In this case, since a part of the table existing in the second area is at a position higher than the height 702, the part is detected as an object area. Accordingly, such part is considered to be a noise 801. On the yz plane, the noise portion positions just below the actual hand, and an y coordinate detected as an object area looks like the same as an ideal state in FIG. 6A. However, the noise 801 has the same size as the width of the table top 301 in the x axis direction, so that the shape of the object area including the noise 801 is not recognized as a hand of a user. This causes reduction in the operation recognition accuracy. On the other hand, FIG. 6C illustrates a case in which a detected height of the table top is higher than a true table height in a state where the edge of the table is detected to be at a position closer to the inside of the table than the actual position. In such a case, the part lower than the height 702 in the hand 501 is not detected as an object area. Accordingly, a loss 802 is produced. Depending on the size and the shape of the loss 802, the object area detected in the first area and the object area detected in the second area become discontinuous. This may cause reduction in the accuracy in the recognition of an operation by the hand.

In this exemplary embodiment, based on the information at the border part of the areas in the object area that has been extracted by the processing performed on the first area, the size of the second height threshold value is changed or its application range is limited to reduce the occurrence of the noise and loss in the object area.

Figure 7:
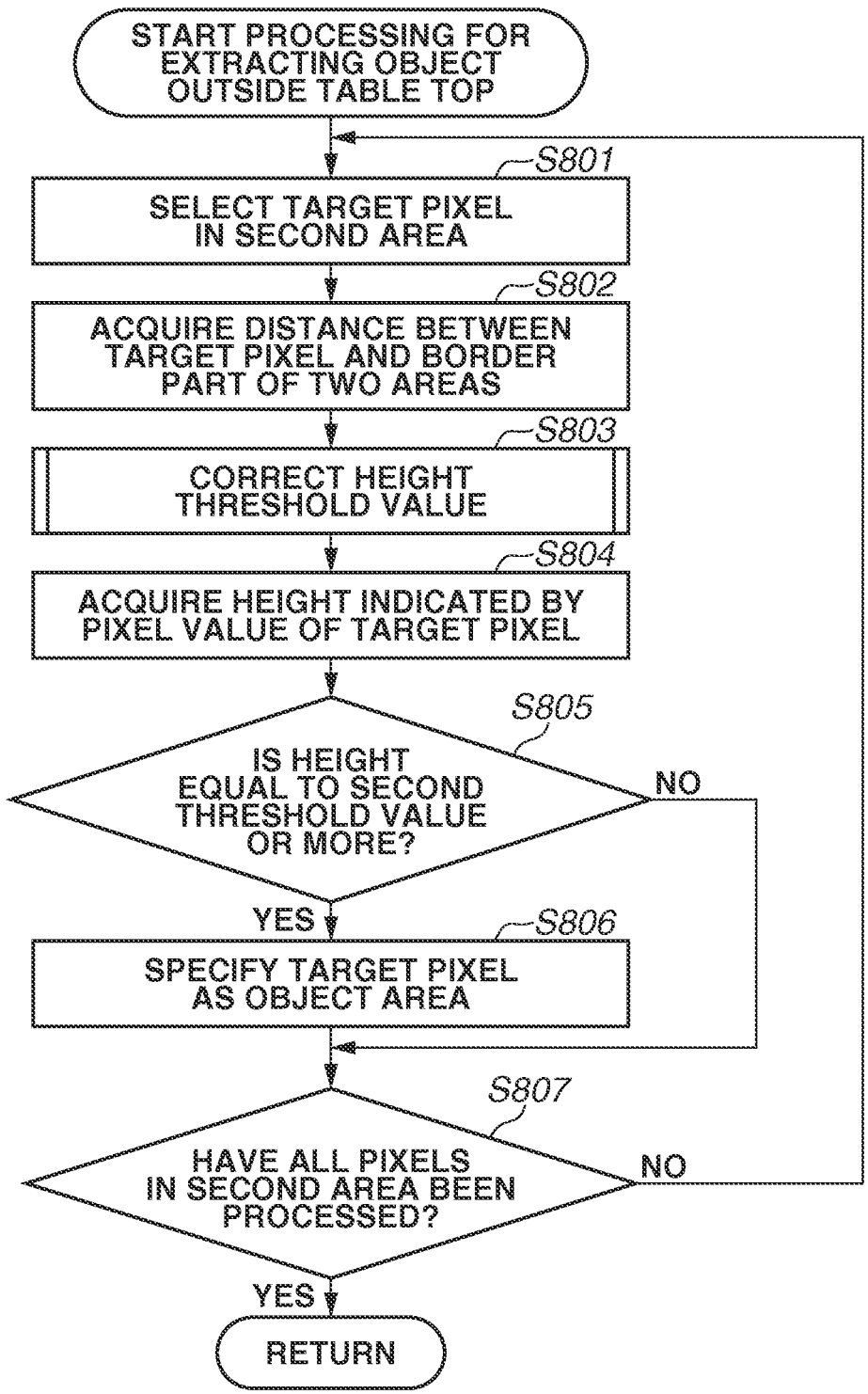
FIG. 7 is a flowchart illustrating an example of processing for extracting an object area in an area including no table.

With reference to the flowchart in FIG. 7, a flow of the processing for detecting an object area in the second area to be performed in step S405 is described in detail.

In step S801, the height acquisition unit 202 selects a target pixel included in the second area from the input image. In this exemplary embodiment, the target pixel is selected one by one. Alternatively, a block including a plurality of pixels can be selected one by one and the average value of the pixel values can be used as the height information of the block, so that the subsequent processing can be performed. In step S802, the threshold determination unit 204 acquires a position (xy coordinates) corresponding to the target pixel, and a distance from a part of the border of the first and the second areas including the object area extracted in the first area, the part being detected in step S404. In this exemplary embodiment, a shortest distance with respect to the y coordinate is calculated.

In step S803, the threshold determination unit 204, corrects the height threshold value (second height threshold value) determined in step S401 depending on the distance acquired in step S802. The processing is performed to prevent the first area and the second area from becoming discontinuous, and to prevent the table from being detected at a position where the hand of the user cannot exist, which causes a noise. In an area where the distance acquired in step S802 is short, that is, in an area corresponding to the periphery of the border, the height threshold value is reduced to prevent the area from becoming discontinuous. On the other hand, in an area the distance acquired in step S802 is long, that is, an area far from the hand of the user, the height threshold value is increased to prevent the table from being included in the object area as a noise. The processing in step S803 is described below in detail.

In step S804, the height acquisition unit 804 acquires a height indicated by the pixel value of the target pixel. In step S805, the extraction unit 205 determines whether the acquired height is greater than or equal to the second height threshold value. The second threshold value is the value corrected in step S803. If it is determined that the height is greater than or equal to the second height threshold value (YES in step S805), the processing proceeds to step S806. If it is determined that the acquired height is not greater than or equal to the second height threshold value (NO in step S805), the processing proceeds to step S807. In step S806, the extraction unit 205 specifies the target pixel as a part of the object area. In step S807, whether all pixels in the second area have been processed is determined. If it is determined that all pixels in the second area have been processed (YES in step S807), the processing returns to the main flow, and the processing in step S404 and steps thereafter is performed. If it is determined that all pixels in the second area have not been processed (NO in step S807), the processing returns to step S801. A pixel that has not been processed is selected as a target pixel, and the processing is repeated. In the flowchart in FIG. 7, a target pixel is selected from the pixels in the second area that has been defined in advance, and the processing is performed on all pixels in the second area. Alternatively, processing for scanning all pixels in the input image, and determining whether the pixels are included in the second area can be additionally performed.

In this exemplary embodiment, the processing is performed in a space having the table installed to be parallel to the ground as the background. Consequently, in the second area, a pixel having a height indicated by a pixel value higher than the second height threshold value is specified as an object area. In a case where the table top included in the background is not parallel to the ground, however, a pixel having the positional information (the positional information in the direction intersecting with the table top) indicated by the pixel value indicating a position of the side closer to the foreground (the side closer to the range image sensor 105) than the surface of the table top is specified as an object area.

Figure 8B:
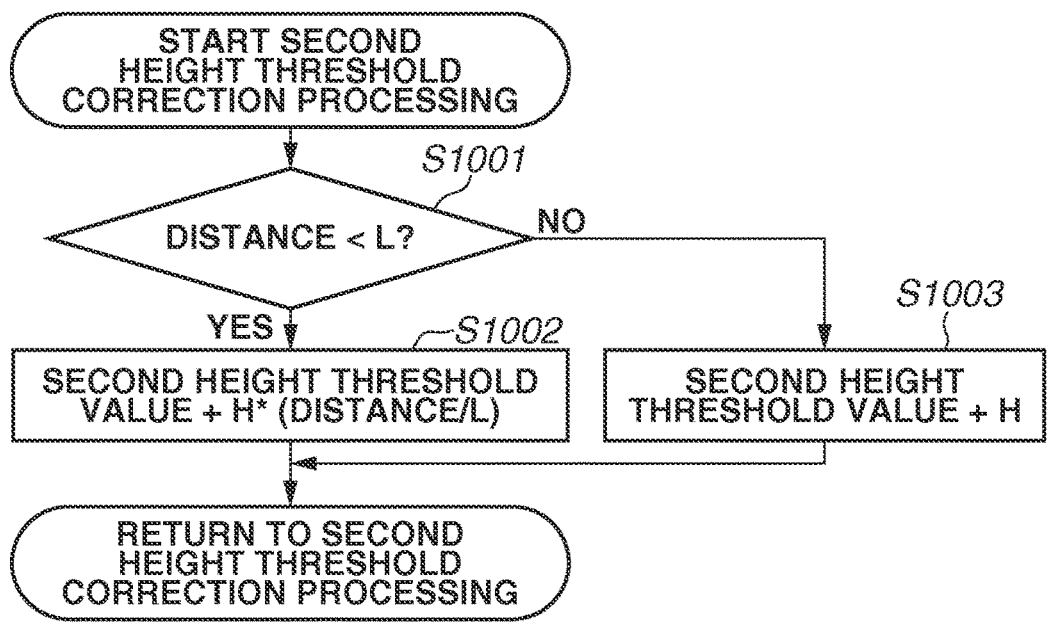

With reference to the flowchart in FIG. 8B and the conceptual views in FIGS. 9 to 12, the processing for correcting the second height threshold value to be performed in step S803 is described.

Figure 9:
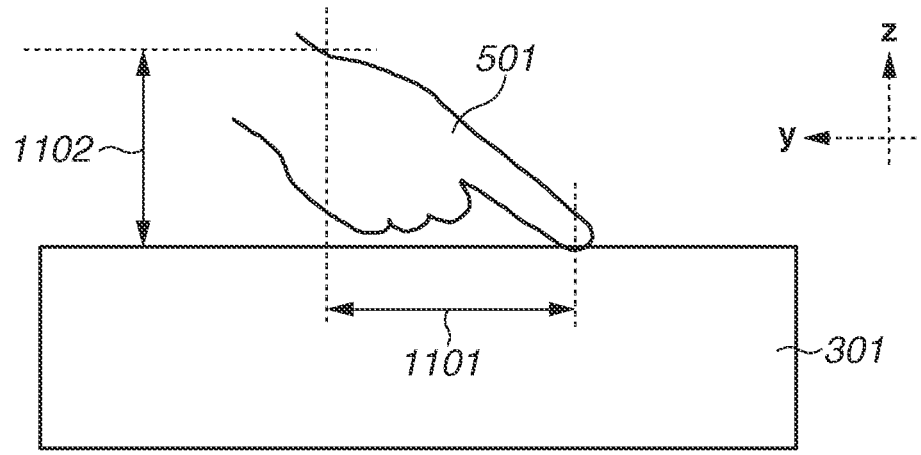
FIG. 9 is a conceptual view illustrating a range of parameters to be used in second height threshold value correction processing.

The flowchart in FIG. 8B illustrates detailed processing to be performed in step S803. In step S1001, the CPU 101 determines whether the distance acquired in step S802 is larger than a threshold value L. If the distance L is smaller than L (YES in step S1001), in step S1002, a value H*(distance/L) proportional to the distance is added to the second height threshold value. On the other hand, if the distance is larger than or equal to L (NO in step S1001), in step S1003, a value H is added to the second height threshold value. As a result, the second height threshold value in the periphery of the border of the two areas becomes smaller than the second height threshold value in the range far from the periphery. With reference to FIG. 9, the threshold value L and the value H are described. The threshold value L is set such that the threshold value L does not exceed a horizontal distance 1101 from the fingertip to the wrist at the time of touching the table with the fingertip, while the value H is set such that the value H does not exceed a height 1102 of the wrist at the time of the touch. If the threshold value L and the value H are set to exceed the limitations, the second height threshold value exceeds the heights of the finger and the wrist at the time of the touch. This may cause a loss in the extracted area. In this exemplary embodiment, as an example according to the above-described limitations, the values are set as follows: the threshold value L=80 mm, and the value H=30 mm.

Figure 10A:
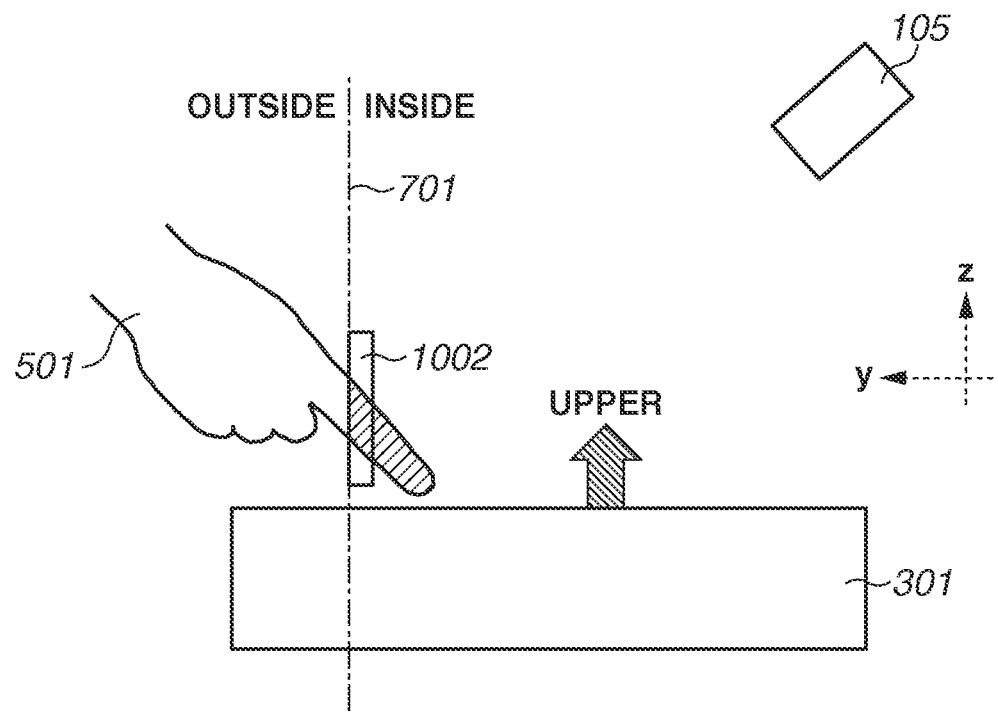
FIG. 10A and FIG. 10B are conceptual views illustrating processing for correcting the second height threshold value.
Figure 10B:
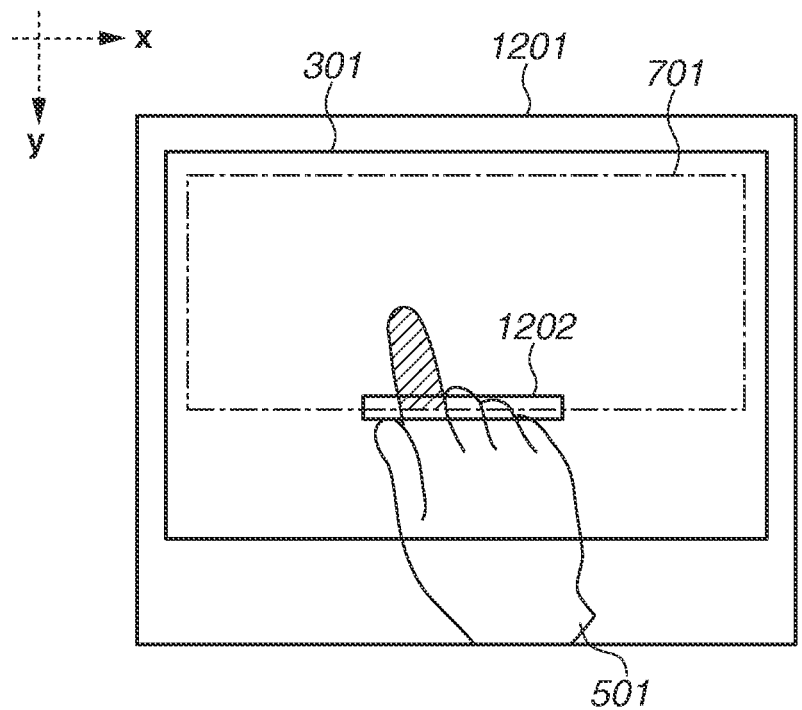
Figure 11A:
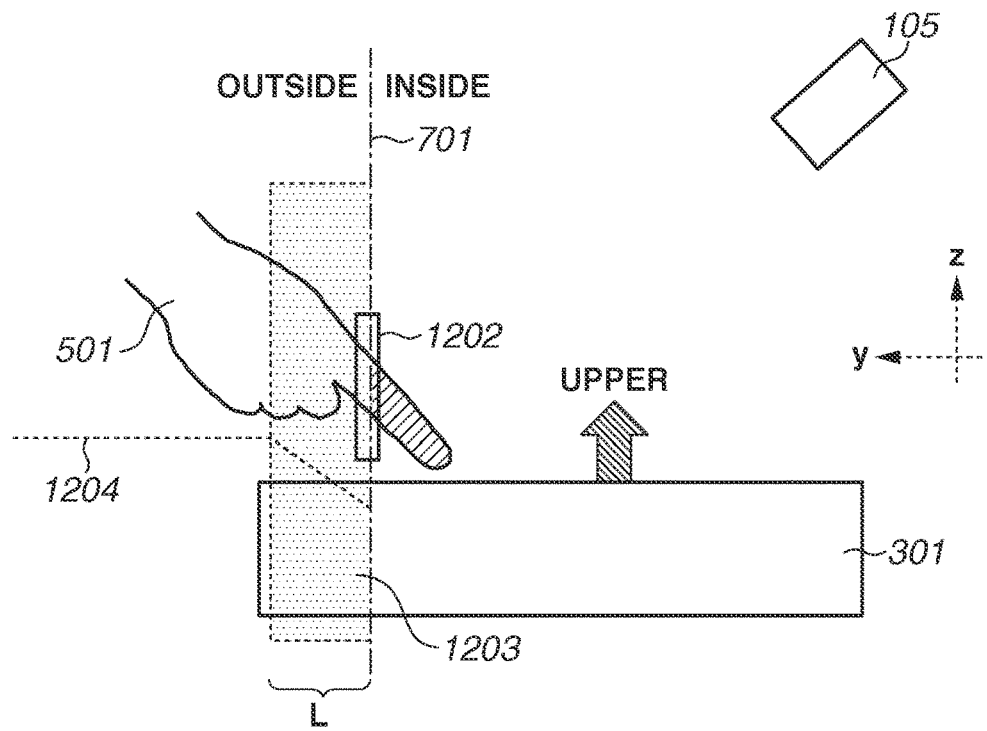
FIG. 11A and FIG. 11B are conceptual views illustrating processing for correcting the second height threshold value.
Figure 11B:
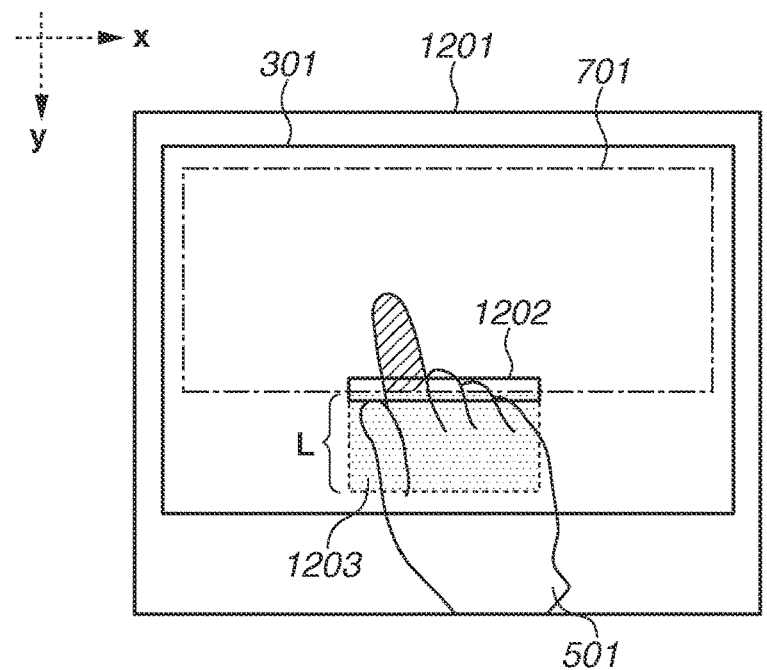
Figure 12A:
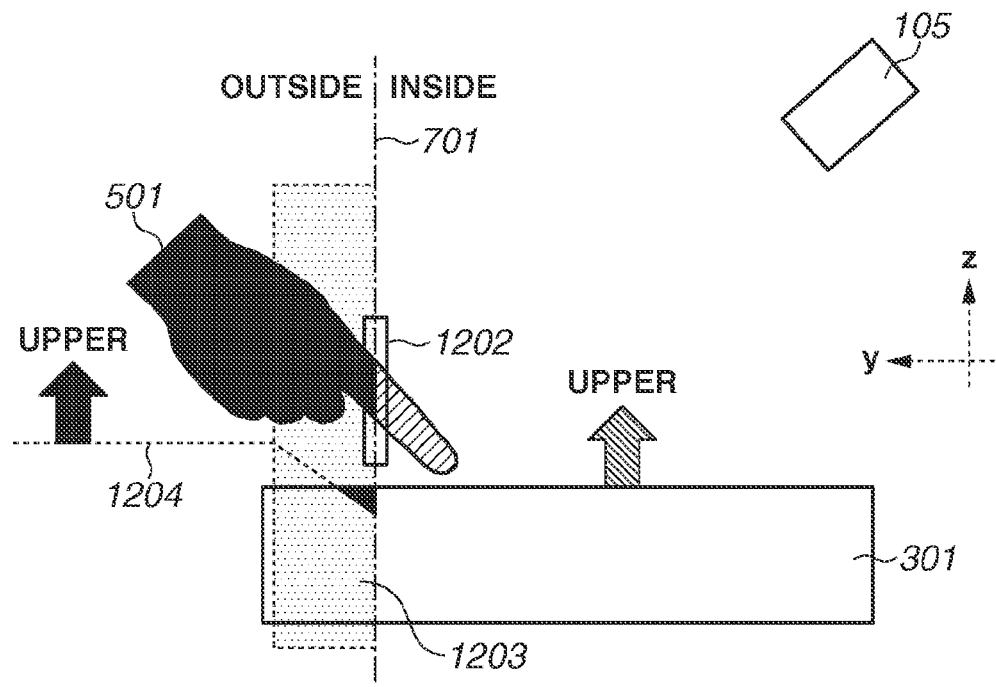
FIG. 12A and FIG. 12B are conceptual views illustrating processing for correcting the second height threshold value.
Figure 12B:
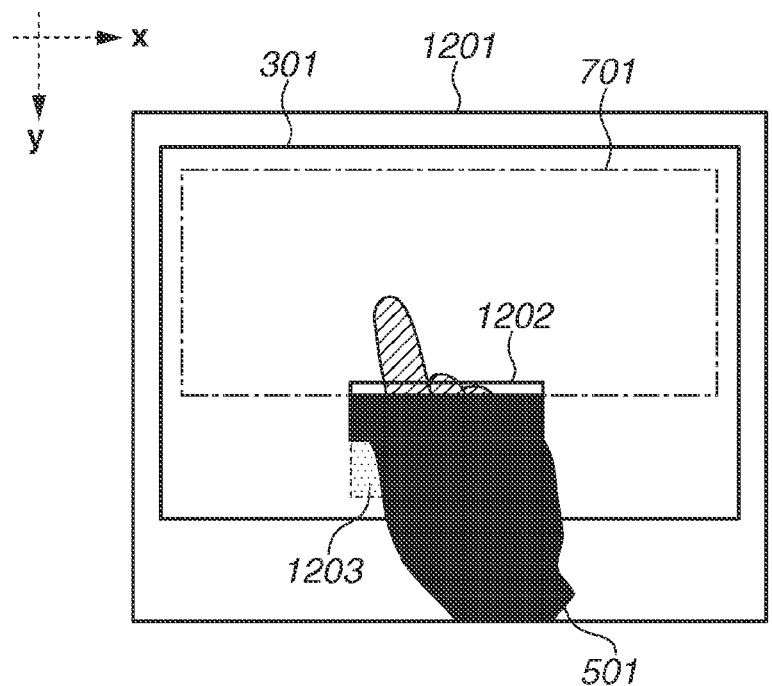

With reference to FIGS. 10A to 12B, a specific example of correction of the second threshold value is described. FIGS. 10A to 12B illustrate, similarly to FIGS. 6B and 6C, states the edge of the table is detected so that the edge exists at a position closer to the inside of the table than the actual position. FIGS. 10A, 11A, and 12A illustrate cross-sectional views from an yz plane. FIGS. 10B, 11B, and 12B illustrate images of the table top 301 viewed from above along the z axis. The images are captured by the range image sensor 105, and correspond to input images to be input in the information processing apparatus 100. In this exemplary embodiment, an actual input image is a range image. The drawings show that the inside of the border 701 is the first area, and the outside is the second area, and the first area is smaller than the actual table top 301 surface.

In this exemplary embodiment, when a range image corresponding to an image 1201 illustrated in FIG. 10B is input, a part of the finger of the user is extracted as an object area in the first area of the inside of the border 701, and in step S404, a part of the border 701 including the extracted area is acquired. In this example, a tangent line 1202 is assumed to be acquired. FIGS. 11A and 11B illustrate that, in a range 1203 of the periphery of the border, the second height threshold value is corrected to a small value depending on the distance from the tangent line 1202. A broken line 1204 indicates the corrected second threshold value. FIG. 12B illustrates, in the second area of the outside of the border 701 in the image 1201, a part extracted as an object area in black. In the periphery of the border, since the height threshold value is corrected to a small value, no loss occurs in the object area. Consequently, even if a part of the table is placed at a position lower than the threshold value indicated by the broken line 1204, the range to be detected as the object area is limited to an area very close to the object area that has been extracted in the first area. Therefore, the shape of the combined object area is not largely deformed, and the occurrence of noise is reduced.

The processing for correcting the height threshold value in step S803 can be omitted in a state illustrated in FIG. 6A, in which the border of the first area and the second area is accurately acquired. For example, when the user directly inputs positional information indicating the border, or when the edge portion of the table is accurately detected according to edge detection processing in a visible light image, there might be the possibility that the table top is included in the second area is low. In the case where the correction can be omitted, in the first area, a method of using a relative height from the table top as a reference height can be employed, and in the second area, a method of using a reference height based on the detection of the edge of the table can be employed. This enables accurate detection of a hand of a user existing over the edge of the table.

In the first exemplary embodiment, depending on a distance from the border corresponding to the edge of the table including the object area extracted in the area including the table, the second height threshold value is corrected. Alternatively, the processing in step S404 can be omitted, and in step S802, a shortest distance between the border line of the areas and the target pixel can be acquired.

The threshold value of the height corrected by the second height threshold value correction processing according to the first exemplary embodiment is set, in the second area, as a value higher than the actual table top, and consequently, it may become difficult to detect an object existing above the table top. In a case where an object that is not extending over the border of the first and second areas is to be detected, the processing can be separately performed by using the second height threshold value that has not been corrected yet. Therefore, to detect an object existing outside the table, such modification can be alternatively used or can be used together the first exemplary embodiment to increase the extraction performance.

In the first exemplary embodiment, in step S406, whether the extracted area is a hand of the user is recognized based on the shape (the size, the degree of circularity, the aspect ratio, and the degree of unevenness) and the color information of the extracted object area to reduce the possibility that the operation is incorrectly recognized due to an object other than the operation object. Alternatively, based on an amount of entry into the table, the object can be recognized. For example, it is assumed that an area of an object area extracted in the first area is an amount of entry, and a total area of an object area extracted in the first and second areas is a size. Then, threshold value determination is performed to determine whether the amount of entry and the size are within appropriate ranges, respectively. This enables removal of an unnatural object area.

Further, the first exemplary embodiment can be applied, in place of the table top I/F, to a system for extracting an area including an object existing in the foreground of a table top that is a background from a range image obtained by capturing a space including the table top.

Now, a second exemplary embodiment having, in addition to the first exemplary embodiment, a configuration for reducing deviation generated as a result of the threshold value processing in each of the first area and the second area is described. As an appearance of an information processing system and a hardware configuration according to the second exemplary embodiment are similar to those in the first exemplary embodiment described with reference to FIG. 1 and FIG. 2, the same reference numerals are applied and detailed descriptions are omitted. In a functional configuration according to the second exemplary embodiment, however, the threshold determination unit 204 according to the second exemplary embodiment has a plurality of candidate values for the second height threshold value, and selects a threshold value having a small deviation from an extraction result of an object area in the first area.

Figure 13:
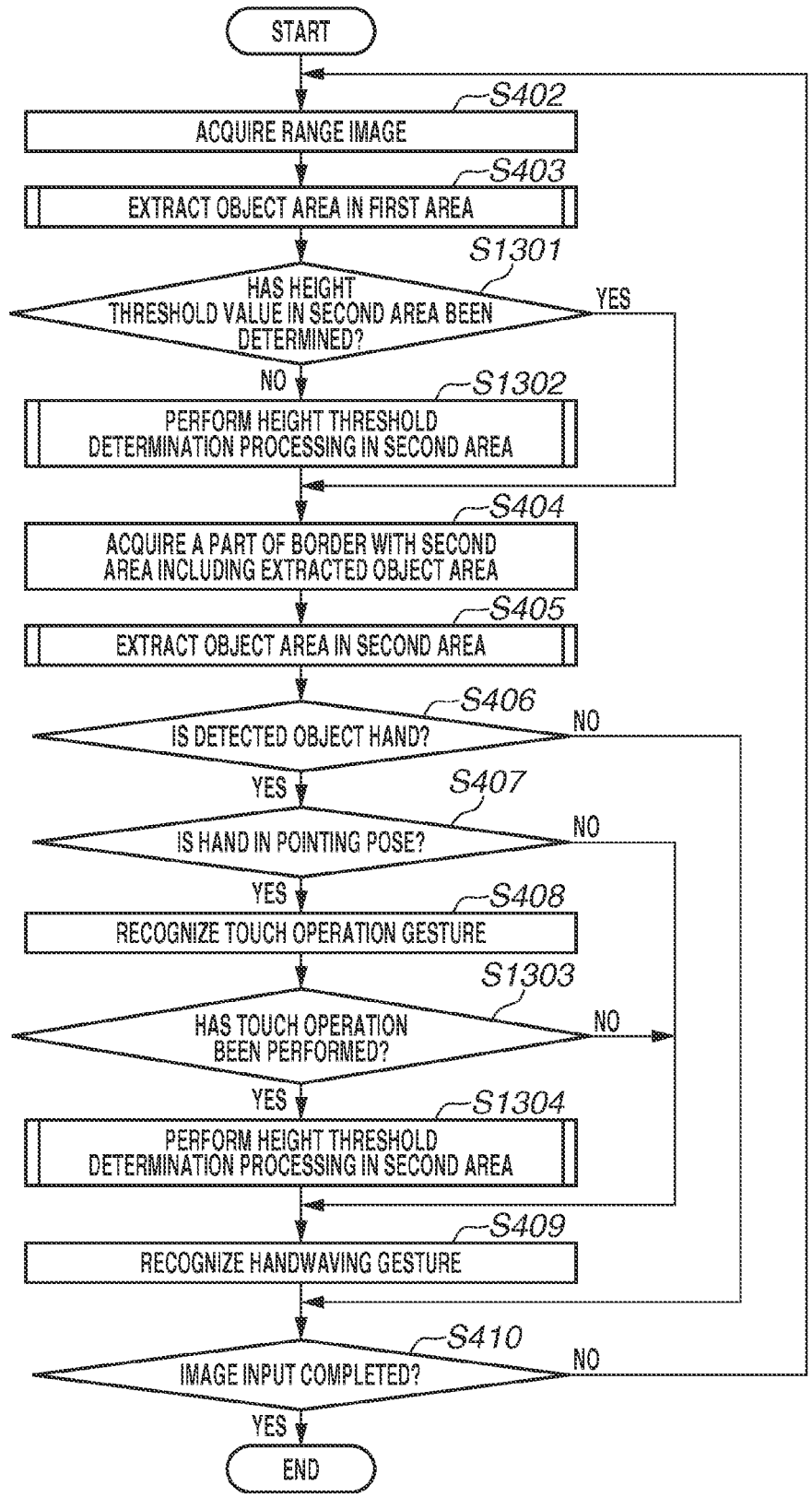
FIG. 13 is a flowchart illustrating an example of the gesture recognition processing according to a second exemplary embodiment.
Figure 15:
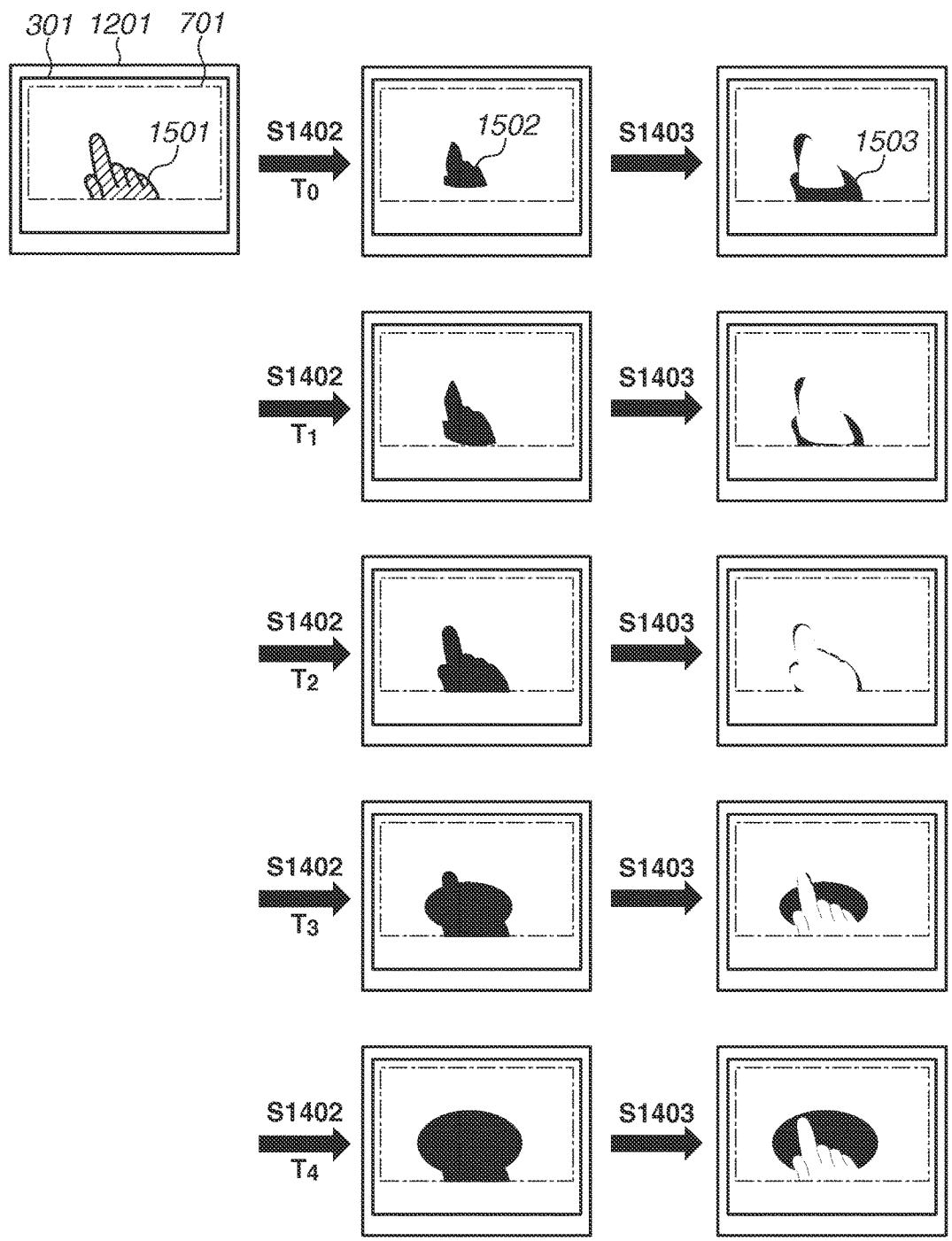
FIG. 15 is a diagram illustrating an example of the flowchart illustrating the processing for determining the second height threshold value according to the second exemplary embodiment.

With reference to the flowchart in FIG. 13, gesture recognition processing according to the second exemplary embodiment is described. This processing is implemented by the CPU 101, which constitutes the functional units in the information processing apparatus, by loading a program stored in the ROM 102 into the RAM 103 and executing the program. This processing starts in response to input of a range image captured by the range image sensor 105 in the image acquisition unit 201. FIG. 15 illustrates examples of change in object areas extracted at a stage where the processing in each step in the flowchart in FIG. 13 is performed. In FIG. 13, at the steps having the same reference numerals as those in the flowchart in FIG. 3, processing similar to that in FIG. 3 is performed, so that detailed descriptions are omitted and differences from FIG. 3 will be described.

In the second exemplary embodiment, in step S403, an object in the first area is extracted, and the processing proceeds to step S1301.

In step S1301, the threshold determination unit 204 determines whether a second height threshold value has been determined. Specifically, the threshold determination unit 204 determines based on whether the information of a determined second height threshold value is stored in the RAM 103. If a second height threshold value has not been determined, that is, undecided (NO in step S1301), in step S1302, a second height threshold value is determined.

Figure 14:
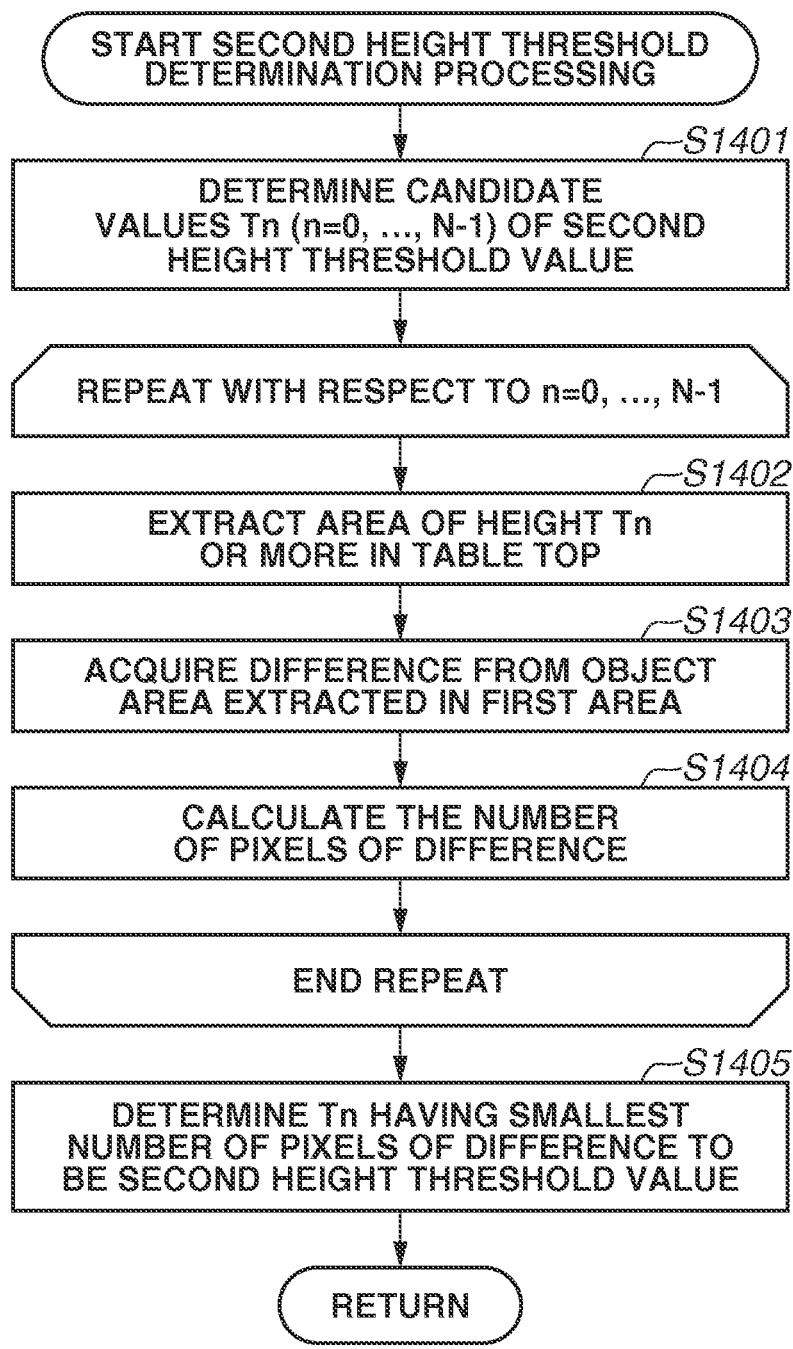
FIG. 14 is a flowchart illustrating an example of processing for determining the second height threshold value.

With reference to the flowchart in FIG. 14 and FIG. 15, a flow of determination processing of the second height threshold value (S1302) to be performed by the threshold determination unit 204, which is a functional unit in the CPU 101, is described. In step S1401, the threshold determination unit 204 determines N candidate values Tn (n=0, . . . N−1) of the second height threshold value. A plurality of candidate values Tn are provided using an expected table top height as the reference, and with a range including upper and lower values. For example, by processing similar to that in step S401, a height to be a reference height is calculated, and a plurality of values within a predetermined range including upper and lower values are determined. Alternatively, for example, candidate values determined in advance based on a fixed positional relationship between the range image sensor 105 and the table top 301 can be read out from the storage device 104 or the like and determined. Then, with respect to the respective candidate values Tn, the processing from step S1402 to step S1404 is repeatedly performed. In step S1402, pixels within the table in the image are scanned, and an area of a height of Tn or more is extracted. In the example illustrated in FIG. 15, an area 1502 is extracted. In step S1403, a difference from the object area in the first area extracted in step S404 is acquired. In this exemplary embodiment, an exclusive OR operation is performed. In the case of FIG. 15, a difference 1503 between an object area 1501 extracted in the first area and an area 1502 extracted in step S1402 is acquired. In step S1404, the CPU 101 acquires the number of the pixels. The above-described processing is performed with respect to each Tn (n=0, . . . , N−1). In step S1405, the threshold determination unit 204 determines Tn having a smallest number of difference pixels to be the second height threshold values, and stores the information in the RAM 103. In FIG. 15, the height of the threshold values becomes low as the processing from step S1402 to step S1404 is repeated, and at the stage where T2 is used, the acquired number of difference pixels becomes the smallest. According to the above-described second height threshold value determination processing, a threshold value having a small difference in the extraction references between the inside and the outside of the table can be acquired. In response to the determination of the second height threshold value, the processing returns to the flowchart in FIG. 13, and the processing in step S406 and steps thereafter is performed.

In the second exemplary embodiment, after the processing for recognizing a touch operation is performed in step S408, the processing proceeds to step S1303, and the threshold determination unit 204 determines whether a touch operation has been performed. If a touch operation has been performed (YES in step S1303), the processing proceeds to step S1304. On the other hand, during a predetermined waiting time in the processing in step S408, if no touch operation is performed on the table top with a fingertip of the user, the threshold determination unit 204 determines that no touch operation has been performed (NO in step S1303), and the processing proceeds to step S409. In step S1304, the threshold determination unit 204 determines the second height threshold value again. The second height threshold value determination processing in step S1304 is, similarly to that in step S1302, performed according to the flowchart in FIG. 14. When the user performs the touch operation, the hand of the user exists at a height contacting the table top. Consequently, at the time when the touch operation is performed, the determination processing of the height threshold value corresponding to the height of the table is performed again, and this enables to calculate a height threshold value enabling further accurate recognition of the table and a hand. It is not always necessary to determine the threshold value again every time a touch operation is performed, and timing for the processing can be limited. For example, the threshold value is determined again when a first touch operation is performed after a start-up operation of the information processing apparatus 100. As described above, the timing for the processing is limited to preferentially use the processing capability of the CPU 101 for a response to a touch operation.

The second exemplary embodiment can be applied, in place of the table top I/F, to a system for extracting an area including an object existing the foreground of a table top that is a background from a range image obtained by capturing a space including the table top.

According to the exemplary embodiments of the present invention, in a space including a plurality of areas of different background conditions, accurate object recognition can be performed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-141805, filed Jul. 9, 2014, which is hereby incorporated by reference herein in its entirety.

What is claimed is:

1. An information processing apparatus comprising:
at least one processor for causing the information processing apparatus to:
acquire an input image having one or more pixels and, for each pixel of the input image, positional information of at least an object in the acquired input image and a surface in the acquired input image in a space including the surface as part of a background; and
extract from the acquired input image, in an a first area including the surface in the background, an a first object area corresponding to an the object existing in the a foreground with respect to the surface, based on the positional information of the object in the acquired input image, the positional information of the surface, and a first reference, and to extract from the acquired input image, in a second area not including the surface in the background, an a second object area corresponding to the object existing in the foreground with respect to the surface, based on the positional information of the object in the acquired input image, and a second reference different from the first reference.

2. The information processing apparatus according to claim 1, wherein the first reference is a reference relating to a distance of a first part of the object from the surface, acquired from the positional information of the object including positional information of the first part of the object in the acquired input image, and the positional information of the surface.

3. The information processing apparatus according to claim 2, wherein the first object area includes the first part of the object where the distance of the first part of the object from the surface, acquired from the positional information of the first part of the object in the acquired input image, is larger than the first reference.

4. The information processing apparatus according to claim 1, wherein the second reference is a threshold reference positioned along an axis in a direction intersecting with the surface, and wherein, for each pixel of the input image being evaluated or targeted, the at least one processor further causes the information processing apparatus to include the evaluated or targeted pixel in the second object area in response to the evaluated or targeted pixel a having a position closer to the foreground side than the surface.

5. The information processing apparatus according to claim 1, wherein the at least one processor further causes the information processing apparatus to recognize an operation input in the information processing apparatus based on a whole shape of a combined object area obtained by combining the extracted first object area and the extracted second object area.

6. The information processing apparatus according to claim 5, wherein in response to a determination that the object is a hand of a user in a pointing pose based on the whole shape of the combined object area, the at least one processor further causes the information processing apparatus to recognize a touch on the surface with the a fingertip of the hand of the user based on the positional information of a-the fingertip of the hand of the user acquired from the input image, and in response to a determination that that the object in the combined object area is not the hand of the user in the pointing pose, the at least one processor further causes the information processing apparatus to not recognize the touch on the surface by the object.

7. A method of controlling an information processing apparatus, the method comprising:

acquiring an input image having one or more pixels and, for each pixel of the input image, positional information of at least an object in the acquired input image and a surface in the acquired input image in a space including the surface as part of a background;

extracting from the acquired image, in a first area including the surface in the background, a first object area corresponding to the object existing in a foreground with respect to the surface, based on the positional information of the object in the acquired input image, the positional information of the surface, and a first reference, and extracting, from the acquired input image, in a second area not including the surface in the background, a second object area corresponding to the object existing in the foreground with respect to the surface, based on the positional information of the object in the acquired input image, and a second reference different from the first reference.

8. A non-transitory computer-readable storage medium storing at least one computer program for causing a computer to execute the method according to claim 7.

9. An information processing apparatus comprising:
At least one processor for causing the information processing apparatus to:
acquire a range image in which distance information corresponding to a height direction is reflected in a pixel value in a space including a table; and
in a first area including an upper surface of the table in a background, extract from the acquired range image as an object area corresponding to an object existing at a position higher than the table in the space a part having a pixel value indicating that a relative height from the table top is higher than a first threshold value, and extract from the acquired range image, in a second area not including the table top in the background, as the object area, a part having a pixel value indicating a height higher than a second threshold value set based on a height of the upper surface of the table as the object area.

10. The information processing apparatus according to claim 9, wherein the at least one processor further causes the information processing apparatus to determine as the second threshold value, a value corresponding to the height of the upper surface of the table acquired based on a pixel value of a range image acquired.

11. The information processing apparatus according to claim 10, wherein the at least one processor further causes the information processing apparatus to correct the second threshold value by a correction amount corresponding to a distance from a part included in a border of the first area and the second area, in the object area extracted from the first area.

12. The information processing apparatus according to claim 10, wherein the at least one processor further causes the information processing apparatus to correct the second threshold value to a value corresponding to a height lower than the height of the upper surface of the table at a position included in the periphery of the part included in the border of the first area and the second area, and correct the second threshold value to a value corresponding to a height higher than the height of the upper surface of the table at a position not included in the periphery of the part included in the border of the first area and the second area, in the object area extracted from the first area by the extraction unit.

13. The information processing apparatus according to claim 10, wherein the at least one processor further causes the information processing apparatus to determine a plurality of candidates for the second threshold value based on the height of the upper surface of the table acquired based on a pixel value of a range image acquired in advance, and determine a value to be used for the extraction of an object area in the second area from the plurality of candidates based on the size of an object area extracted from the first area.

14. The information processing apparatus according to claim 9, wherein the at least one processor further causes the information processing apparatus to determine a value of the second threshold value, and
wherein the at least one processor further causes the information processing apparatus to determine, at the time when a touch of the object in the object area onto the table top is recognized, a value of the second threshold value again based on height information acquired from a part of the extracted object area.

15. A method for controlling an information processing apparatus, the method comprising:
acquiring a range image in which distance information corresponding to a height direction is reflected in a pixel value in a space including a table;
extracting, in a first area including an upper surface of the table in a background, as an object area corresponding to an object existing at a position higher than the table in the space, a part having a pixel value indicating that a relative height from the table top is higher than a first threshold value, and
extracting, in a second area not including the table top in the background, as the object area from the acquired range image, a part having a pixel value indicating a height higher than a second threshold value set based on a height of the upper surface of the table.

16. A non-transitory computer-readable storage medium storing a computer program for causing a computer to execute the method according to claim 15.

* * * * *